(12) United States Patent
Holbrook et al.

(10) Patent No.: US 6,205,390 B1
(45) Date of Patent: Mar. 20, 2001

(54) SHIFT LEVER POSITION LOGIC

(75) Inventors: Gerald L. Holbrook; Andrew J. Harkenrider, both of Rochester Hills; Michael J. McNeil, Auburn Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/283,899

(22) Filed: Apr. 1, 1999

(51) Int. Cl.$^7$ .................. F16H 59/00; B60K 41/06
(52) U.S. Cl. .................. 701/62; 477/128; 701/51
(58) Field of Search .................. 701/51, 62, 63, 701/64, 55, 56; 475/127, 132; 74/731.1, DIG. 7, 335, 473.1, 473.21; 477/128, 129, 34, 111, 115, 121, 130, 156, 117

(56) References Cited

U.S. PATENT DOCUMENTS

| | | | |
|---|---|---|---|
| 4,916,961 | 4/1990 | Holbrook et al. | 74/337.5 |
| 4,938,102 | * 7/1990 | Leising et al. | 74/866 |
| 4,944,200 | 7/1990 | Benford et al. | 74/867 |
| 4,965,735 | 10/1990 | Holbrook et al. | 364/424.1 |
| 5,016,176 | 5/1991 | Holbrook et al. | 364/424.1 |
| 5,090,269 | 2/1992 | Ohtsuka et al. | 74/861 |
| 5,304,981 | 4/1994 | Leising et al. | 340/456 |
| 5,420,565 | 5/1995 | Holbrook | 340/456 |
| 5,460,577 | * 10/1995 | Moroto et al. | 475/123 |
| 5,522,779 | * 6/1996 | Tabata et al. | 477/126 |
| 5,598,334 | 1/1997 | Shin et al. | 364/424.08 |
| 5,913,935 | * 6/1999 | Anderson et al. | 74/335 |
| 5,916,292 | * 6/1999 | Issa et al. | 701/62 |

* cited by examiner

Primary Examiner—Tan Nguyen
Assistant Examiner—Dalena Tran
(74) Attorney, Agent, or Firm—Marc Lorelli

(57) ABSTRACT

A method of determining the shift lever position of an electronic automatic transmission system by identifying the mode of transmission operation selected by the driver of the vehicle to provide hysteresis between the park, reverse, neutral, drive and low positions, to permit improved performance and response of the controller and to permit limited operation of the controller upon the occurrence or detection of a fault effecting the performance of the transmission. Such faults include the loss of a PRND2L sensor and the loss of one or more sensors indicative of the dynamics of the vehicle or hydraulic circuit.

19 Claims, 9 Drawing Sheets

| CONTACT | P | $T_1$ | R | $T_2$ | $N_1$ | $N_2$ | $T_3$ | D | $T_4$ | 2 | $T_5$ | L |
|---|---|---|---|---|---|---|---|---|---|---|---|---|
| TRACK C5 | | | | | | | | | | | | |
| TRACK C4 | | | | | | | | | | | | |
| TRACK C3 | | | | | Contact Grounded | | | | | Contact Insulated | | |
| TRACK C2 | | | | | | | | | | | | |
| TRACK C1 | | | | | | | | | | | | |
| CODE C5 | 0 | 0 | 1 | 1 | 1 | 1 | 1 | 1 | 1 | 0 | 0 | 0 |
| CODE C4 | 1 | 1 | 1 | 1 | 1 | 0 | 0 | 0 | 0 | 0 | 1 | 1 |
| CODE C3 | 1 | 1 | 1 | 0 | 0 | 0 | 0 | 0 | 1 | 1 | 1 | 0 |
| CODE C2 | 0 | 0 | 0 | 0 | 0 | 0 | 0 | 1 | 1 | 1 | 1 | 1 |
| CODE C1 | 0 | 1 | 1 | 1 | 0 | 0 | 1 | 1 | 1 | 1 | 1 | 1 |

SHIFT LEVER POSITION LOGIC

BACKGROUND OF THE INVENTION

1. Technical Field

The present invention relates generally to an automatic transmission and more particularly to a method of determining the shift lever position selected by the driver of a transmission that is controlled electronically and hydraulically.

2. Discussion

Generally speaking, land vehicles require three basic components. These components comprise a power plant (such as an internal combustion engine) a power train and wheels. The internal combustion engine produces force by the conversion of the chemical energy in a liquid fuel into the mechanical energy of motion (kinetic energy). The function of the power train is to transmit this resultant force to the wheels to provide movement of the vehicle.

The power train's main component is typically referred to as the "transmission". Engine torque and speed are converted in the transmission in accordance with the tractive-power demand of the vehicle. The vehicle's transmission is also capable of controlling the direction of rotation being applied to the wheels so that the vehicle may be driven both forward and backward.

A conventional transmission includes a hydrodynamic torque converter to transfer engine torque from the engine crankshaft to a rotatable input member of the transmission through fluid-flow forces. The transmission also includes frictional units which couple the rotating input member to one or more members of a planetary gearset. Other frictional units, typically referred to as brakes, hold members of the planetary gearset stationary during flow of power. These frictional units are usually brake clutch assemblies or band brakes. The drive clutch assemblies can couple the rotating input member of the transmission to the desired elements of the planetary gearsets, while the brakes hold elements of these gearsets stationary. Such transmission systems also typically provide for one or more planetary gearsets in order to provide various ratios of torque and to ensure that the available torque and the respective tractive power demand are matched to each other.

Transmissions are generally referred to as manually actuated or automatic transmissions. Manual transmissions generally include mechanical mechanisms for coupling rotating gears to produce different ratio outputs to the drive wheels. Automatic transmissions are designed to take automatic control of the frictional units, gear ratio selection and gear shifting. A thorough description of general automatic transmission design principals may be found in "Fundamentals of Automatic Transmissions and Transaxles," Chrysler Corporation Training Manual No. TM-508A. Additional descriptions of automatic transmissions may be found in U.S. Pat. No. 3,631,744, entitled "Hydromatic Transmission," issued Jan. 4, 1972 to Blomquist, et al., and U.S. Pat. No. 4,289,048, entitled "Lock-up System for Torque Converter," issued on Sept. 15, 1981 to Mikel, et al. Each of these patents is hereby incorporated by reference.

In general, the major components featured in such an automatic transmission are: a torque converter as above-mentioned; fluid pressure-operated multi-plate drive or brake clutches and/or brake bands which are connected to the individual elements of the planetary gearsets in order to perform gear shifts without interrupting the tractive power; one-way clutches in conjunction with the frictional units for optimization of power shifts; and transmission controls such as valves for applying and releasing elements to shift the gears, for enabling power shifting, and for choosing the proper gear, dependent on shift-program selection by the driver, accelerator position, the engine condition and vehicle speed.

The control system of the automatic transmission is typically hydraulically operated through several valves which are operable for directing and regulating the supply of pressurized fluid. This hydraulic pressure control will cause either the actuation or deactuation of the respective frictional units for effecting gear changes in the transmission. The valves used in the hydraulic control circuit typically comprise spring-biased spool valves, spring-biased accumulators and ball check valves. Since many of these valves rely upon springs to provide a predetermined amount of force, it will be appreciated that each transmission design represents a finely tuned arrangement of interdependent valve components. While this type of transmission control system has worked well over the years, it does have its limitations.

In view of these limitations, several advanced transmission control systems have been proposed. One such system was disclosed in U.S. Pat. No. 3,956,947 to Leising, et al., issued on May 18, 1979, the disclosure of which is hereby incorporated by reference. The automatic transmission disclosed in U.S. Pat. No. 3,956,947 features an adaptive control system that includes electronically operated solenoid-actuated valves for controlling certain fluid pressures. In accordance with this electric/hydraulic control system, the automatic transmission would be responsive to an acceleration factor for controlling the output torque of the transmission during a shift from one ratio of rotation (between the input and output shafts of the transmission) to another. Specifically, the operation of the solenoid-actuated valves would cause a rotational speed versus time curve of a sensed rotational component of the transmission to substantially follow along a predetermined path during shifting.

Another advanced transmission control system was disclosed in U.S. Pat. No. 4,965,735 to Holbrook et al., the disclosure of which is hereby incorporated by reference. The system disclosed in U.S. Pat. No. 4,965,735 in an improved adaptive transmission control system utilizes an electronic controller to receive input signals indicative of engine speed, turbine speed, output speed (vehicle speed), throttle angle position, brake application, predetermined hydraulic pressure, the driver selected gear, engine coolant temperature and/or ambient air temperature. The controller generates command signals for causing the actuation of a plurality of solenoid-actuated valves which regulate the application and release of pressure to and from the frictional elements of the transmission system. Accordingly, the controller executes predetermined shift schedules stored in the memory of the controller through appropriate command signals to the solenoid-actuated valves and the feedback which is provided by various input signals.

Another significant aspect of U.S. Pat. No. 4,965,735 is the ability to utilize closed-loop feedback to control the transmission. Closed-loop feedback allows the control system to perform its functions based on real-time feedback sensor information. This is particularly advantageous as the control actuation can be corrected as opposed to an open-loop control in which signals to various elements are processed in accordance to a predetermined program. The controller is also programmed to determine the shift lever position of the driver selected gear of the transmission to provide hysteresis between the various gear positions, and to provide limited operation of the transmission in the event the sensors which determine the driver selected gear or operating conditions are not operating properly.

Despite these advancements, there remains a need in the art for an improved transmission control system which is more reliable in operation and which provides improved fault detection. Furthermore, there remains a need in the art for an improved transmission control system which provides enhanced functionality despite the existence of a fault within the transmission control system.

SUMMARY OF THE INVENTION

It is therefore one object of the present invention to provide a transmission control methodology that provides improved response and performance.

It is another object of the present invention to provide a transmission control methodology having improved fault detection capabilities.

It is a further object of the present invention to provide a transmission control methodology having improved functionality in the event that a fault within the transmission control system.

To achieve the foregoing objects, the transmission controller includes an electronic control module which receives input signals indicative of engine speed, turbine speed, vehicle speed, throttle angle position, brake application, predetermined hydraulic pressure, the driver selected gear or operating condition, engine coolant temperature, and/or ambient temperature. The control module generates command or control signals for causing the actuation of a plurality of solenoid-actuated valves which regulate the application and release of pressure to and from the frictional units of the transmission. Accordingly, the control module will execute predetermined shift schedules stored in the memory of the control module through appropriate command signals to the solenoid-actuated valves and the feedback which is provided by various input signals.

A primary feature of the present invention is to provide an improved adaptive control methodology based on closed-loop control. This is particularly advantageous because the control actuation can be corrected to accommodate the performance and response of the transmission. Also advantageously, closed-loop control also permits the detection of faults that effect the performance of the transmission to be accurately identified, allowing the control methodology to disregard "suspect" data and control the operation of the transmission using data from inputs which are known to be functioning properly.

In accordance with one aspect of the present invention, the controller is programmed to determine the shift lever position of the driver selected gear or operating mode of the transmission to provide hysteresis between the PRND2L positions and to provide limited operation of the transmission in the event the PRND2L sensor or other input devices are not operating properly.

Additional advantages and features of the present invention will become apparent from the subsequent description and the appended claims, taken in conjunction with the accompanying drawings.

DETAILED DESCRIPTION OF THE PREFERRED EMBODIMENT

Figures 1A, 1C:
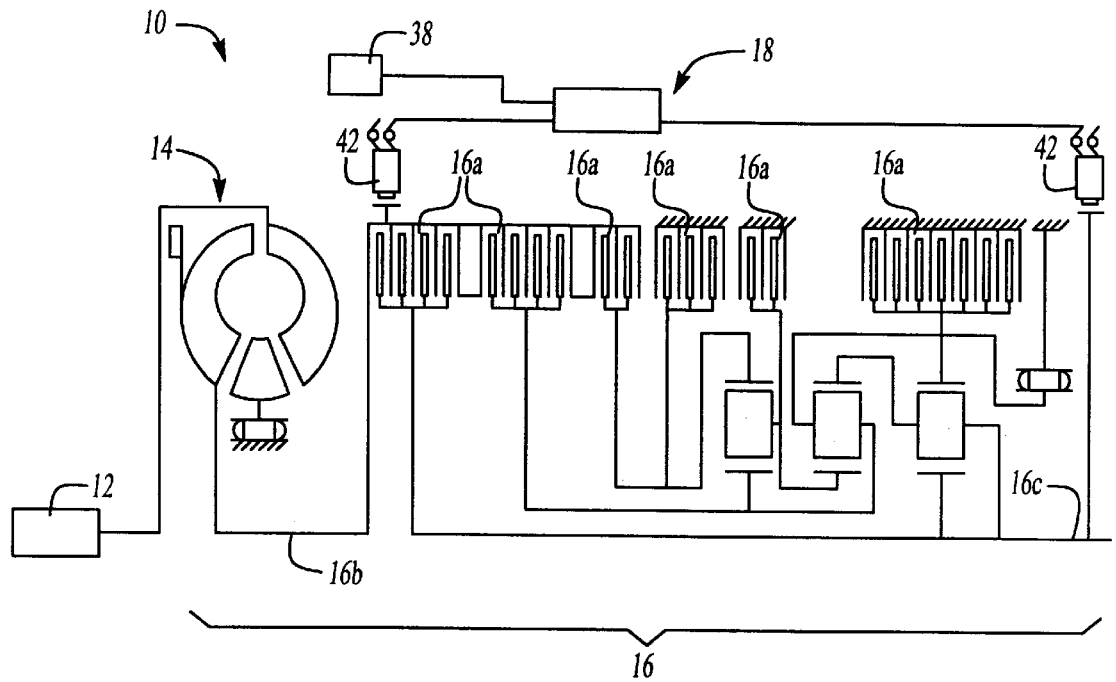
FIG. 1A is a schematic diagram of a motor vehicle.
FIG. 1C is a diagram showing the PRND2L code produced by the PRND2L sensor.
Figure 1B:
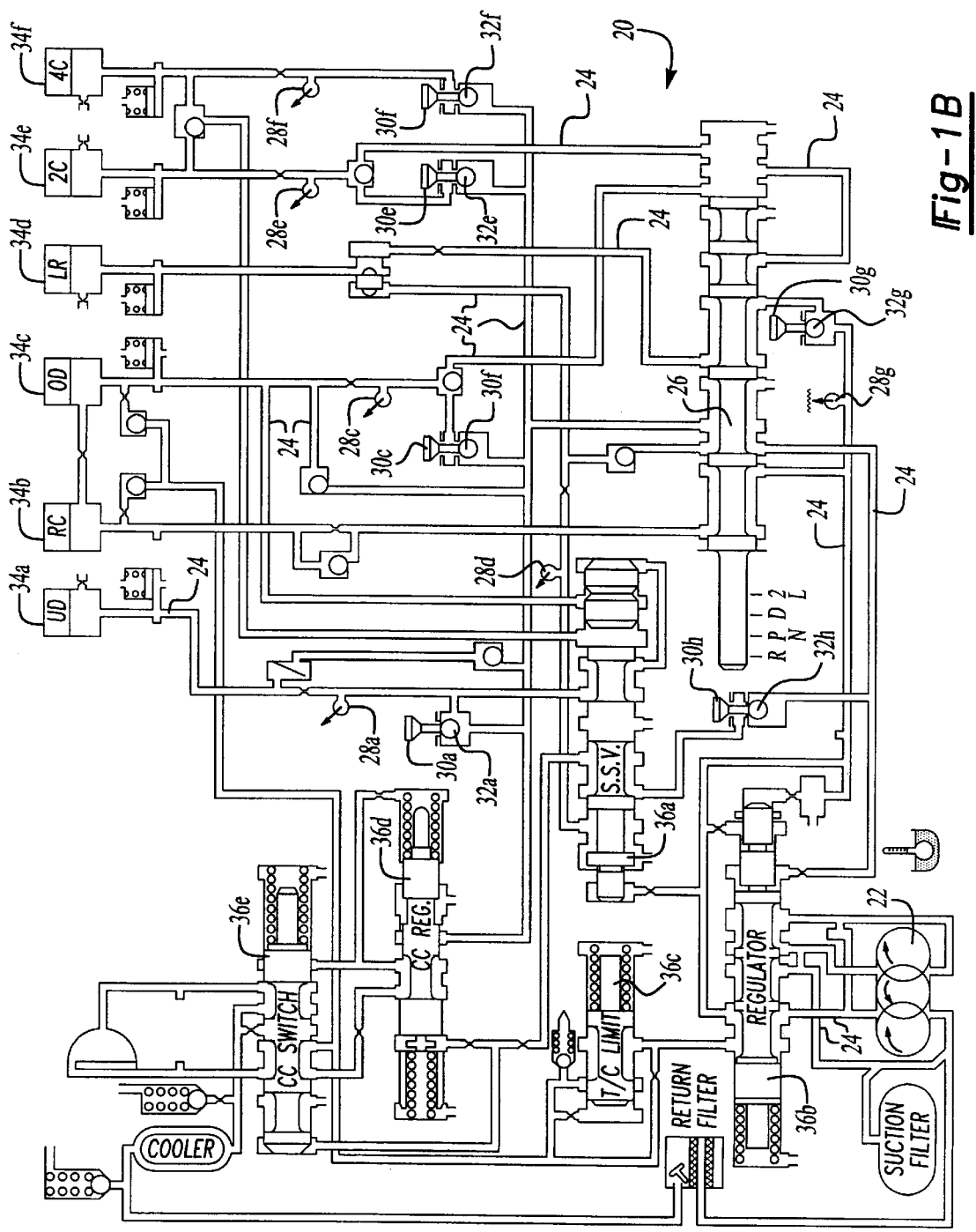
FIG. 1B is a schematic diagram of the hydraulic circuitry of the transmission shown in FIG. 1A.

Referring to FIG. 1A, a portion of a motor vehicle 10 is schematically shown. Motor vehicle 10 includes an engine 12, a torque converter 14 and an automatic-type hydraulic transmission 16 having a plurality of gear ratios 16a such as reverse, neutral, overdrive, direct, second and low, an input member 16b for receiving a torque input, an output member 16c and a transmission controller 18. The hydraulic circuit 20 of transmission 16 is shown in detail in FIG. 1B. Hydraulic circuit 20 includes a fluid pump 22, a plurality of hydraulic conduits 24, a manual valve 26, a plurality of pressure switches 28, a plurality of solenoids 30 each coupled to a directional valve 32, a plurality of clutches 34 for selectively engaging any of the plurality of gear ratios 16a, and a plurality of directional spool valves 36. Generally speaking, pressurized fluid supplied from pump 22 is directed to one or more desired clutches 34 through one or more hydraulic conduits 24 by the efforts of manual valve 26, and in some circumstances, one or more directional valves 32 and/or one or more directional spool valves 36.

The transmission controller 18 includes a shift lever (not shown), a PRND2L sensor 38, an electronic control module 40 and a plurality of sensors 42 for producing sensor signals in response to various vehicle dynamics, such as the input and output speeds of transmission 16. The shift lever is operable for causing manual valve 26 to translate in a linear manner between the R, N, D and 2 positions to thereby cause the flow of pressurized fluid to be directed to one or more desired hydraulic conduits 24. PRND2L sensor 38 senses the relative position of either the shift lever or manual valve 26 and produces a PRND2L code (PC) indicative of the position of the manual valve 26. Preferably, PRND2L sensor 38 includes five contact points and produces a PC that corresponds to the PRND2L code shown in FIG. 1C. As shown, the PC includes codes indicating that manual valve 26 has been position to supply fluid to one or more predetermined conduits 24. Such codes include P, R, N1, N2, D, 2 and L. The PC also includes codes indicating that manual valve 26 is in transition between two or more predetermined conduits 24. Such codes include T1, T2, T3, and T4. The last transition code, T5, is used as an electronic control point in the methodology and its generation does not indicate that manual valve 26 is being moved.

The transmission controller 18 relies on the Shift Lever Position (SLP) methodology to identify the mode of transmission operation selected by the driver to provide hysteresis between the PRND2L positions, to improve the performance and response of transmission 16 and to permit limited operation of transmission 16 without functioning PRND2L sensor 38 by utilizing pressure switch data from pressure switches 28 to determine the position of manual valve 26.

Figure 2:
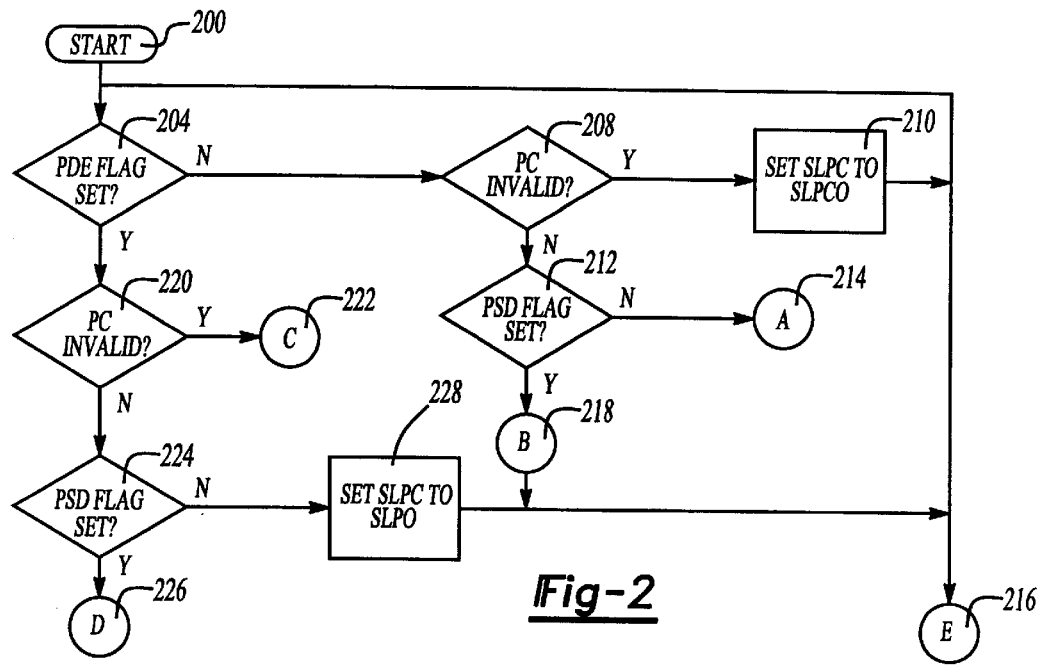
FIG. 2 is a schematic diagram in flowchart form of a portion of the method of the present invention.

Referring now to FIG. 2, the SLP methodology of the present invention is entered at bubble 200. The methodology advances to decision block 204 where the PRND2L data error (PDE) flag is checked. The PDE flag is set if an invalid PRDN2L code (PC) has been maintained for a time exceeding a predetermined PDE time threshold. An invalid PC is obtained when the signal from the PRND2L sensor is not indicative of any of the predetermined shift lever positions. If the PDE flag has not been set (i.e., an invalid PC has not been maintained for a PDE time threshold), the methodology will proceed to decision block 208 where the methodology evaluates the PC. If the PC is invalid, the methodology assumes that the invalid PC is an intermittent condition and proceeds to block 210 where the current shift lever logic position (SLPC) is set to the previous shift lever logic position (SLP0). The methodology then loops back to decision block 204. Returning to decision block 208, if the PC is not invalid, the methodology proceeds to decision block 212 where the pressure switch data available (PSD) flag is checked. The PSD flag is used to prevent improper use of the pressure switch data in the SLP methodology. The PSD flag is typically set if hydraulic pressure is available and the pressure switches are capable of providing a reliable signal.

If the PSD flag has not been set indicating that data from the pressure switches is not available, the methodology advances to bubble 214 where the methodology continues along branch A which is discussed in detail below. Operation along branch A assumes that the vehicle engine is not running or that there is a failure in the supply of hydraulic fluid, necessitating that the SLP methodology to rely on the PC and SLP0 to change SLPC. If the PSD flag has been set indicating that data from the pressure switches is available, the methodology advances to bubble 218 where the methodology continues along branch B which is discussed in detail below. Operation along branch B is similar to that of branch A, except that pressure switch data is utilized to improve the performance and response of the SLP methodology.

Referring back to decision block 204, if the PDE flag is set indicating that an invalid PC has been maintained for a time exceeding the predetermined PDE time threshold, the methodology proceeds to decision block 220 where the PC is evaluated. If the PC is not invalid, the methodology advances to bubble 222 where the methodology proceeds along branch C which is discussed in detail below. Operation along branch C essentially permits the SLP methodology to interpret the invalid PC in some situations to determine SLPC. If the PC is invalid, the methodology proceeds to block 224 where the PSD flag is checked.

If the PSD flag is set in decision block 224, the methodology advances to bubble 226 and proceeds along branch D which is discussed in detail below. Operation along branch D primarily necessitates that the SLP methodology rely on SLP0 and pressure switch data to determine SLPC. If the PSD flag is not set in decision block 224, the methodology proceeds to block 228 where SLPC is set to SLP0. The methodology then loops back to decision block 204.

Branch A

Figure 3:
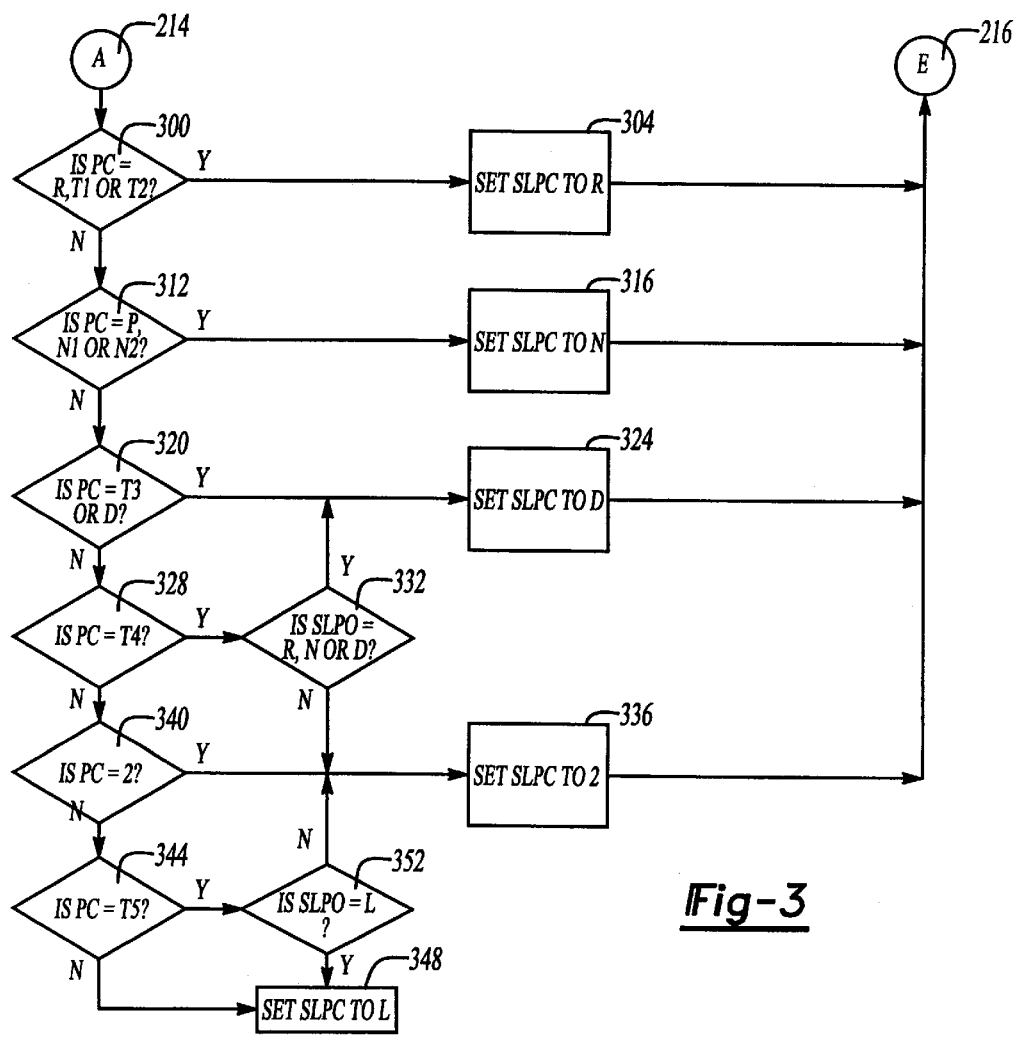
FIG. 3 is a schematic diagram in flowchart form of another portion of the method of the present invention.

With reference to FIG. 3, the methodology proceeds along branch A to decision block 300 where the methodology analyzes the PC. If the PC is indicative of the R, T1 or T2 positions, the methodology selects R as SLPC. The methodology proceeds to bubble 216 where subroutine A terminates and the methodology loops-back to decision block 204 in FIG. 2.

With renewed reference to FIG. 3, if the PC is not indicative of the R, T1 or T2 positions in decision block 300, the methodology proceeds to decision block 312 where the PC is analyzed. If the PC is indicative of the P, N1 or N2 positions, the methodology advances to block 316 where the methodology selects N as SLPC. The methodology would then progress to bubble 216. If the PC is not indicative of the P, N1 or N2 positions in decision block 312, the methodology proceeds to decision block 320.

At decision block 320, the PC is analyzed. If the PC is indicative of the T3 or D positions, the methodology proceeds to block 324 where D is selected as SLPC. The methodology would then progress to bubble 216. If the PC is not indicative of the T3 or D positions in decision block 320, the methodology proceeds to decision block 328 where the methodology analyzes the PC.

If the PC is indicative of the T4 position in decision block 328, the methodology proceeds to decision block 332 where SLP0 is analyzed. If SLP0 is R, N or D in decision block 332, the methodology proceeds to block 324 and D is selected as SLPC. Operation of the SLP methodology in this manner essentially provides hysteresis for the D SLP position. If SLP0 is not R, N or D in decision block 332, the methodology proceeds to block 336 where 2 is selected as SLPC. Operation of the SLP methodology in this manner provides hysteresis for the 2 SLP position. The methodology then proceeds to bubble 216.

Returning to decision block 328, if the PC is not indicative of the T4 position, the methodology proceeds to decision block 340 where the PC is analyzed. If the PC is indicative of the 2 position, the methodology proceeds to block 336. Otherwise, the methodology proceeds to decision block 344.

The PC is analyzed in decision block 344 and if it is not indicative of the T5 position, the methodology proceeds to decision block 348 where L is selected as SLPC. The methodology then proceeds to bubble 216. If the PC is indicative of the T5 position in decision block 344, the methodology proceeds to decision block 352 where SPL0 is analyzed. If SLP0 is not L in decision block 352, the methodology proceeds to block 336. Operation of the SLP methodology in this manner provides hysteresis for the 2 SLP position. If SLP0 is L, the methodology proceeds to block 348. Operation of the SLP methodology in this manner provides hysteresis for the L SLP position.

Branch B

Figure 4:
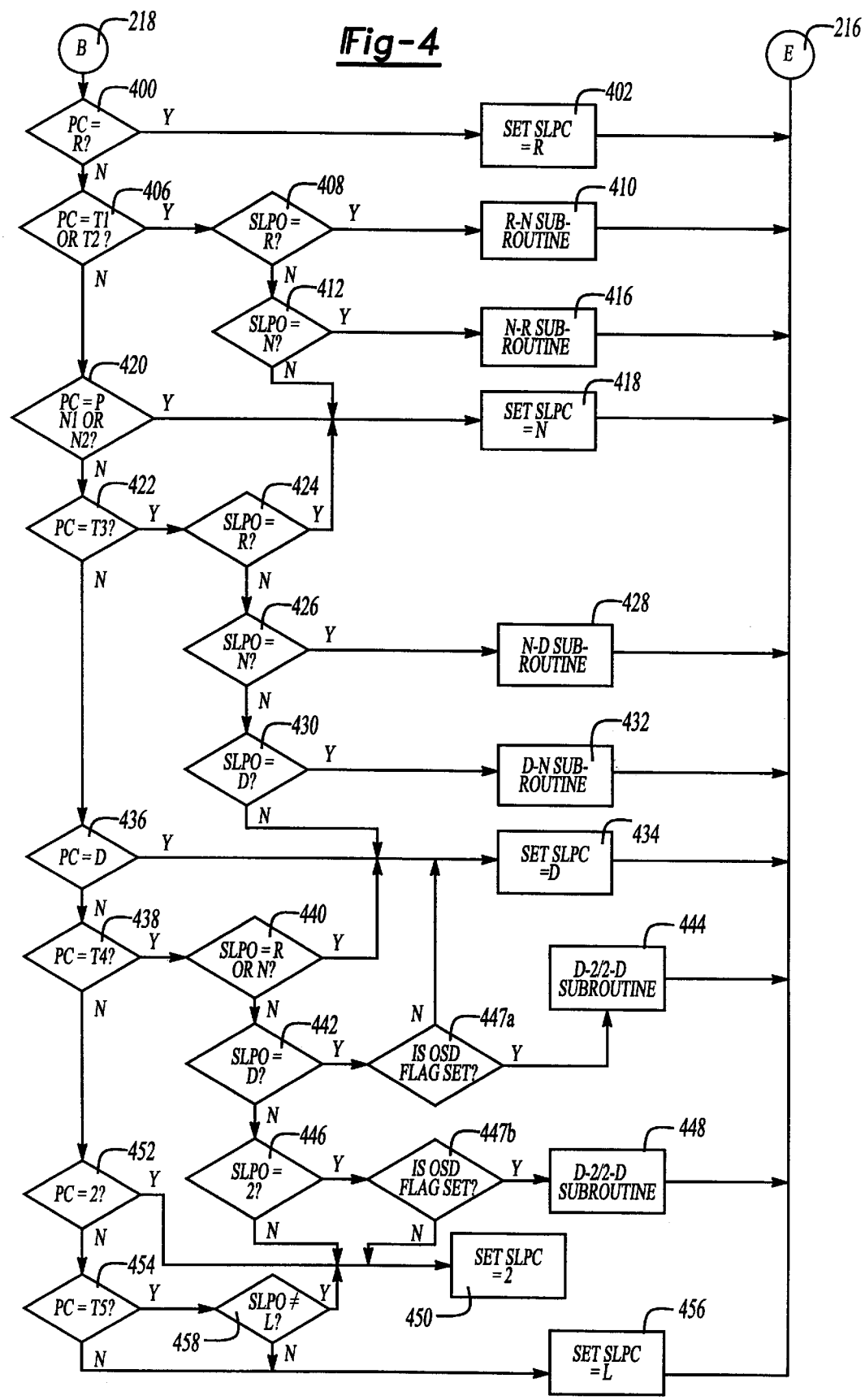
FIG. 4 is a schematic diagram in flowchart form of another portion of the method of the present invention.

With reference to FIG. 4, the methodology proceeds along branch B to decision block 400 where the PC is analyzed. If the PC is indicative of the R position, the methodology proceeds to block 402 where SLPC is set to R. The methodology proceeds to bubble 216 where subroutine B terminates. With brief reference to FIG. 2, the methodology then loops-back to decision block 204.

Returning to decision block 400 in FIG. 4, if the PC is not indicative of the R position, the methodology proceeds to decision block 406 where the PC is analyzed. If the PC is indicative of the T1 or T2 positions in decision block 406, the methodology proceeds to decision block 408 where SLP0 is evaluated. If SLP0 is R, the methodology proceeds to block 410 where the R-N subroutine is performed. The R-N subroutine utilizes pressure switch data to detect whether the manual valve 26 is being shifted out of the R position, allowing for improved response and performance of the SLP methodology. Additionally, the R-N guards against excessive slippage of clutches 34b and 34d. Upon completion of the R-N subroutine, the methodology proceeds to proceeds to bubble 216 where branch B terminates.

Returning to decision block 408, if SLP0 is not R, the methodology proceeds to decision block 412. If SLP0 is N in decision block 412, the methodology proceeds to block 416 where the N-R subroutine is performed. The N-R subroutine utilizes pressure switch data to detect whether the manual valve 26 is being shifted out of the N position into the R position, allowing for improved response and performance of the SLP methodology. Upon termination of the N-R subroutine, the methodology proceeds to bubble 216. Returning to decision block 412, if SLP0 is not N, the methodology proceeds to block 418 where SLPC is set to N. The methodology then proceeds to bubble 216.

Referring back to decision block 406, if the PC is not indicative of the T1 or T2 positions, the methodology proceeds to decision block 420 where the PC is evaluated. If the PC is indicative of the P, N1 or N2 positions in decision block 420, the methodology proceeds to block 418. If the PC is not indicative of the P, N1 or N2 positions in decision block 420, the methodology proceeds to decision block 422.

At decision block 422 the methodology determines if the PC is indicative of the T3 position. If the PC is indicative of the T3 position, the methodology proceeds to decision block 424 where SLP0 is evaluated. If SLP0 is R in decision block 424, the methodology proceeds to block 418. If SLP0 is not R in decision block 424, the methodology proceeds to decision block 426 where the methodology determines if SLP0 is N. If SLP0 is N in decision block 426, the methodology proceeds to block 428 where the N-D subroutine is performed. The N-D subroutine utilizes pressure switch data to detect whether the manual valve 26 is being shifted out of the N position into the D position, allowing for improved response and performance of the SLP methodology. Upon completion of the N-D subroutine, the methodology proceeds to bubble 216 where branch B terminates as described above. Returning to decision block 426, if SLP0 is not N, the methodology proceeds to decision block 430 where SLP0 is evaluated. If SLP0 is D, the methodology proceeds to block 432 where the D-N subroutine is performed. The D-N subroutine utilizes pressure switch data to detect whether the manual valve 26 is being shifted out of the D position and into the N position, allowing for improved response and performance of the SLP methodology. Upon completion of the D-N subroutine, the methodology proceeds to bubble 216 where branch B terminates as described above. Returning to decision block 430, if SLP0 is not D, the methodology proceeds to block 434 where SLPC is set to D. The methodology then proceeds to bubble 216 where branch B terminates as described above.

Referring back to decision block 422, if the PC is not indicative of the T3 position, the methodology proceeds to decision block 436 where the PC is evaluated. If the PC is indicative of the D position in decision block 436, the methodology proceeds to block 434. If the PC is not indicative of the D position, in decision block 436, the methodology proceeds to decision block 438.

At decision block 438 the methodology determines if the PC is indicative of the T4 position. If the PC is indicative of the T4 position, the methodology proceeds to decision block 440 where SLP0 is evaluated. If SLP0 is R or N in decision block 440, the methodology proceeds to block 434. If SLP0 is not R or N in decision block 440, the methodology proceeds to decision block 442 where the methodology determines if SLP0 is D. If SLP0 is D in decision block 442, the methodology proceeds to decision block 447a where the orderly shut down (OSD) flag is checked. If the OSD flag is set in decision block 447a, the methodology proceeds to block 444 where the D-2/2-D subroutine is performed. Under circumstances where SLP0 is D, the D-2/2-D subroutine utilizes pressure switch data to detect whether the manual valve 26 is being shifted out of the D position into the 2 position, allowing for improved response and performance of the SLP methodology. Upon completion of the D-2/2-D subroutine, the methodology proceeds to bubble 216 where branch B terminates. Returning to decision block 447a, if the OSD flag is not set, the methodology proceeds to block 434.

Referring back to decision block 442, if SLP0 is not D, the methodology proceeds to decision block 446 where SLP0 is evaluated. If SLP0 is 2 indecision block 446, the methodology proceeds to decision block 447b where the OSD flag is checked. If the OSD flag is set in decision block 447b, the methodology proceeds to block 448 where the D-2/2-D subroutine is performed. Under circumstances where SLP0 is 2, the D-2/2-D subroutine utilizes pressure switch data to detect whether the manual valve 26 is being shifted out of the 2 position into the D position, allowing for improved response and performance of the SLP methodology. Upon completion of the D-2/2-D subroutine, the methodology proceeds to bubble 216 where branch B terminates. Returning to decision block 447b, if the OSD flag is not set, the methodology proceeds to block 450 where SLPC is set to 2.

Referring back to decision block 446, if SLP0 is not 2, the methodology proceeds to block 450 where SLPC is set to 2. The methodology then proceeds to bubble 216 where branch B terminates as described above.

Referring back to decision block 438, if the PC is not indicative of the T4 position, the methodology proceeds to decision block 452 where the PC is evaluated. If the PC is indicative of the 2 position in decision block 452, the methodology proceeds to block 450. If the PC is not indicative of the D position in decision block 452, the methodology proceeds to decision block 454.

At block 454 the methodology evaluates the PC to determine if the PC is indicative of the T5 position. If the PC is not indicative of the T5 position, the methodology proceeds to block 456 where SLPC is set to L. The methodology then proceeds to bubble 216 where branch B terminates as described above. Returning to decision block 454, if the PC is indicative of the T5 position, the methodology proceeds to decision block 458 where SLP0 is evaluated. If SLP0 is not equal to L in decision block 458, the methodology proceeds to block 450. If SLP0 is equal to L in decision block 458, the methodology proceeds to block 456.

Branch C

Figure 5:
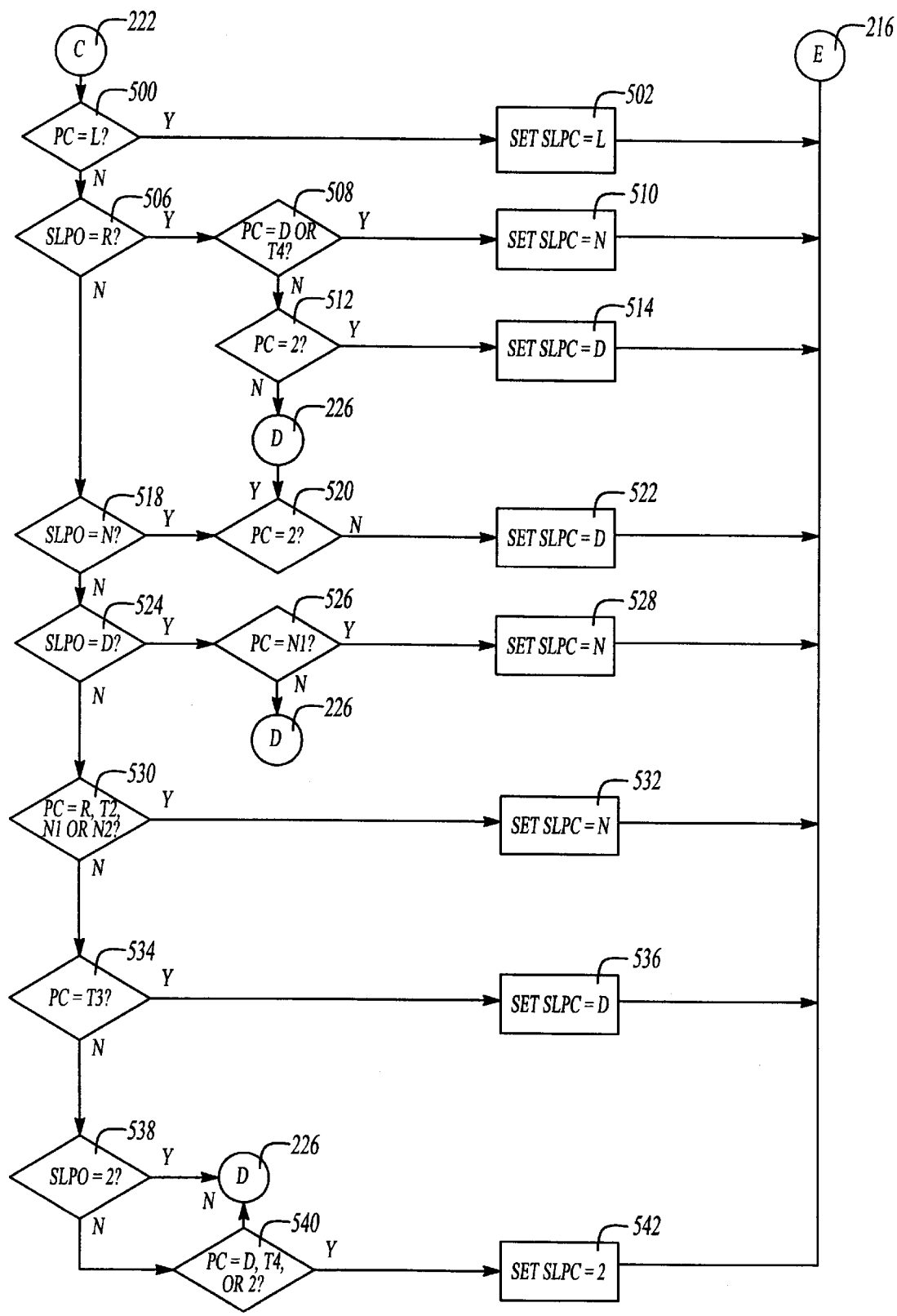
FIG. 5 is a schematic diagram in flowchart form of another portion of the method of the present invention.

With reference to FIG. 5, the methodology proceeds along branch C to decision block 500 where the PC is analyzed. If the PC is indicative of the L position, the methodology proceeds to block 502 where SLPC is set to L. The methodology proceeds to bubble 216 where branch C terminates. With brief reference to FIG. 2, the methodology then loops-back to decision block 204.

Returning to decision block 500 in FIG. 5, if the PC is not indicative of the L position, the methodology proceeds to decision block 506 where SLP0 is evaluated. If SLP0 is R in decision block 506, the methodology proceeds to decision block 508 where the PC is evaluated. If the PC is indicative of the D or T4 positions in decision block 508, the methodology proceeds to block 510 where SLPC is set to N. The methodology then proceeds to bubble 216. Returning to decision block 508, if the PC is not indicative of the D or T4 positions the methodology proceeds to decision block 512 where the PC is evaluated. If PC is indicative of the 2 position in decision block 512, the methodology proceeds to block 514 where SLPC is set to D. The methodology then proceeds to bubble 216. Returning to decision block 512, if the PC is not indicative of the 2 position, the methodology proceeds to bubble 226 where the methodology advances to bubble 226 and enters branch D.

Referring back to decision block 506, if SLP0 is not R, the methodology proceeds to decision block 518 where SLP0 is evaluated. If SLP0 is N, the methodology proceeds to decision block 520 where the PC is evaluated. If the PC is not indicative of the 2 position in decision block 520, the methodology proceeds to bubble 226. If the PC is indicative of the 2 position in decision block 520, the methodology proceeds to block 522 where SLPC is set to D. The methodology then proceeds to bubble 216.

Returning to decision block 518, if SLP0 is not N, the methodology proceeds to decision block 524 where SLP0 is evaluated. If SLP0 is D, the methodology proceeds to decision block 526 where the PC is evaluated. If PC is indicative of the N1 position in decision block 526, the methodology proceeds to block 528 where SLPC is set to N. The methodology then proceeds to bubble 216. Returning to decision block 526, if the PC is not indicative of the N1 position the methodology proceeds to bubble 226.

Referring back to decision block 524, if SLP0 is not D, the methodology proceeds to decision block 530 where the PC is evaluated. If the PC is indicative of the R, T2, N1 or N2 positions in decision block 530, the methodology proceeds to block 532 where SLPC is set to N. The methodology then proceeds to bubble 216. Returning to decision block 530, if the PC is not indicative of the R, T2, N1 or N2 positions the methodology proceeds to decision block 534 where the PC is evaluated. If the PC is indicative of the T3 position in decision block 534, the methodology proceeds to block 536 where SLPC is set to D. The methodology then proceeds to bubble 216.

Returning to decision block 534, if the PC is not indicative of the T3 position, the methodology proceeds to decision block 538 where SLP0 is evaluated. If SLP0 is 2 indecision block 538, the methodology proceeds to bubble 226. If SLP0 is not 2 indecision block 538, the methodology proceeds to decision block 540 where the PC is evaluated. If the PC is not indicative of the D, T4 or 2 positions in decision block 540, the methodology proceeds to bubble 226. If the PC is indicative of the D, T4 or 2 positions in decision block 540, the methodology proceeds to block 542 where SLPC is set to 2. The methodology then proceeds to bubble 216 where branch C terminates.

Branch D

Figure 6:
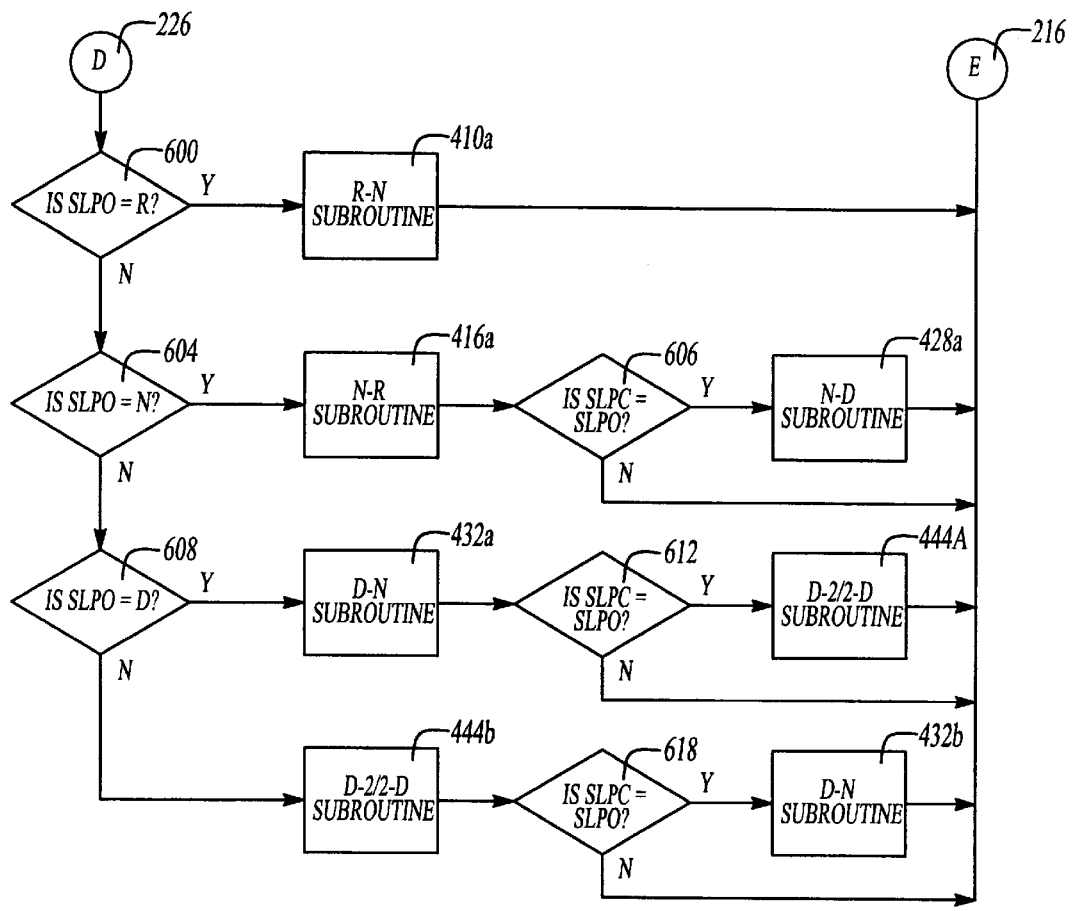
FIG. 6 is a schematic diagram in flowchart form of another portion of the method of the present invention.

With reference to FIG. 6, the methodology proceeds along branch D to decision block 600 where SLP0 is evaluated. If SLP0 is R, the methodology proceeds to block 410a where the R-N subroutine is performed. Upon completion of the R-N subroutine, the methodology proceeds to bubble 216 where branch D terminates. With brief reference to FIG. 2, the methodology then loops-back to decision block 204.

Returning back to decision block 600 in FIG. 6, if SLP0 is not R, the methodology proceeds to decision block 604 where SLP0 is evaluated. If SLP0 is N, the methodology proceeds to block 416a where the N-R subroutine is performed. Upon completion of the N-R subroutine, the methodology proceeds to decision block 606 where SLPC is evaluated. If SLPC is not equal to SLP0 in decision block 606, the methodology proceeds to bubble 216. If SLPC is equal to SLP0 in decision block 606, the methodology proceeds to block 428a where the N-D subroutine is performed. Upon completion of the N-D subroutine, the methodology proceeds to bubble 216.

Referring back to decision block 604, if SLP0 is not N, the methodology proceeds to decision block 608 where SLP0 is evaluated. If SLP0 is D, the methodology proceeds to block 432a where the D-N subroutine is performed. Upon completion of the D-N subroutine, the methodology proceeds to decision block 612 where SLPC is evaluated. If SLPC is not equal to SLP0 in decision block 612, the methodology proceeds to bubble 216. If SLPC is equal to SLP0 in decision block 612, the methodology proceeds to block 444a where the D-2/2-D subroutine is performed. Upon completion of the D-2/2-D subroutine, the methodology proceeds to bubble 216.

Referring back to decision block 608, if SLP0 is not D, the methodology proceeds to block 444b where the D-2/2-D subroutine is performed. Upon completion of the D-2/2-D subroutine, the methodology proceeds to decision block 618 where SLPC is evaluated. If SLPC is not equal to SLP0 in decision block 618, the methodology proceeds to bubble 216. If SLPC is equal to SLP0 in decision block 618, the methodology proceeds to block 432b where the D-N subroutine is performed. Upon completion of the D-N subroutine, the methodology proceeds to bubble 216.

R-N Subroutine

Figure 7:
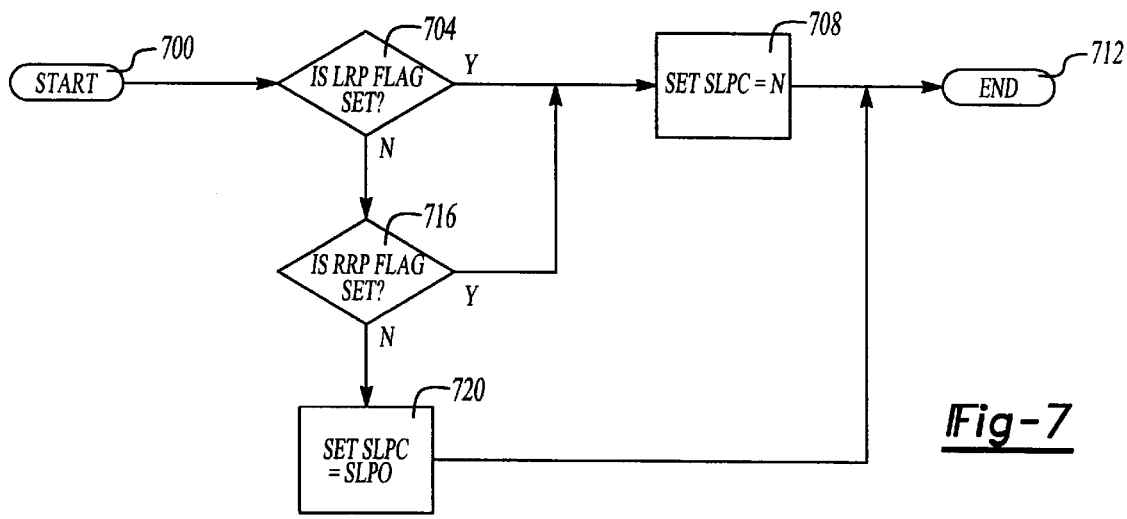
FIG. 7 is a schematic diagram in flowchart form of the R-N subroutine.

Referring now to FIG. 7, the R-N subroutine will be described in detail. The R-N subroutine is entered at bubble 700 and progresses to decision block 704 where the methodology evaluates the low reverse pressure (LRP) flag. The LRP flag is set (i.e., logical state is 1) when pressure switch 28d detects the presence of fluid above a predetermined pressure. If the LRP flag is set indicating that there is sufficient fluid pressure to activate pressure switch 28d, the methodology proceeds to block 708 where SLPC is set to N. The methodology then proceeds to bubble 712 where the subroutine terminates. Returning to decision block 704, if the LRP flag is not set, the methodology proceeds to decision block 716 where the methodology determines if the restricted reverse port (RRP) flag has been set. The RRP flag indicates whether manual valve 26 has been shifted to a point where the flow of fluid to clutch 34b and/or clutch 34d is restricted, thereby causing excessive slippage of their elements which may damage transmission 16. The RRP flag is set, for example, under the following conditions:

INR flag is set, indicating that transmission 16 is operating in the "R" gear ratio; and the PDE flag is not set; and the PC is indicative of the T1 or T2 positions; and the turbine speed of the torque converter 14 exceeds output speed of transmission by a predetermined speed variance (e.g., 200 r.p.m.), indicating that there is slippage between the elements of clutch 34b and/or clutch 34d.

If the RRP flag has been set, the methodology proceeds to block 708 and continues on as described above. If the RRP flag has not been set, the methodology proceeds to block 720 where SLPC is set to SLP0. The methodology then proceeds to bubble 712 and terminates.

N-R Subroutine

Figure 8:
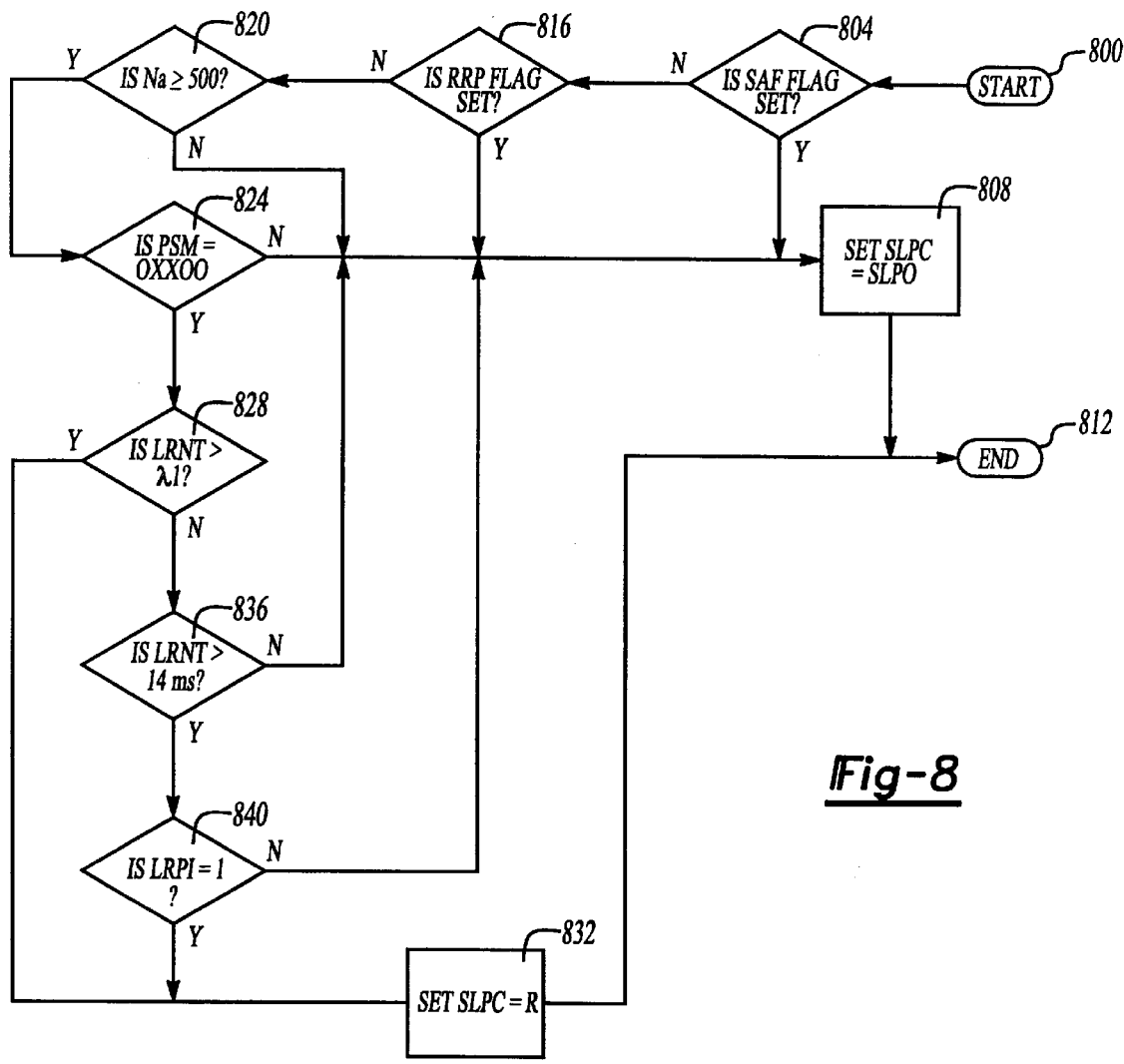
FIG. 8 is a schematic diagram in flowchart form of the N-R subroutine.

With reference to FIG. 8, the N-R subroutine is entered at bubble 800 and proceeds to decision block 804 where the methodology checks the soft LR apply (SAF) flag. The SAF flag is used to designate whether clutch 34d is being gradually engaged by modulating the pressure of the fluid supplied to it. The SAF flag, therefore, is used to prevent the erroneous interpretation of data from pressure switches 28 during the modulation of fluid pressure to clutch 34d.

If the SAF flag is set indicating that fluid pressure to clutch 34d is being modulated, the methodology will proceed to block 808 where SLPC is set to SLP0. The methodology will then proceed to block 812 where the N-R subroutine terminates.

Returning to decision block 804, if the SAF flag is not set indicating that fluid pressure is not being modulated, the methodology will proceed to decision block 816 where the RRP flag is checked. The RRP flag is discussed in detail in the section describing the R-N subroutine, above. If the RRP flag has been set, the methodology proceeds to block 808 and progresses as described above. If the RRP flag has not been set, the methodology proceeds to decision block 820 where the value of the engine speed (Ne) is checked.

If Ne is not greater than or equal to 500 r.p.m. indicating that pump 22 is not able to produce sufficient fluid pressure to operate clutches 34, the methodology proceeds to block 808 and progresses as described above. If Ne is greater than or equal to 500 r.p.m. indicating that pump 22 is able to produce sufficient fluid pressure, the methodology proceeds to decision block 824 where the pressure switch mask (PSM) is checked. The PSM is comprised of five bits, each of which may be a 0 or a 1. Each bit is indicative of the state of a given pressure switch 28 in hydraulic circuit 20. The first through fifth bits correspond to pressure switches 28d, 28e, 28c, 28f, and 28a, respectively. A logical state of 0 indicates that a given pressure switch 28 has not sensed the presence of a fluid which exceeds a predetermined pressure. A logical state of 1 indicates that a given pressure switch 28 has sensed the presence of a fluid which exceeds a predetermined pressure.

If one or more of the first, fourth and fifth bits of the PSM are not equal to zero (i.e., fluid pressure above a predetermined pressure has been detected by one or more of pressure switches 28d, 28f and 28a), the methodology proceeds to block 808 and progresses as described above. If the first, fourth and fifth bits of the PSM are each equal to zero (i.e., fluid pressure above a predetermine pressure has not been detected by pressure switches 28d, 28f and 28a), the methodology proceeds to decision block 828 where the LRON flag time (LRNT) is checked.

The LRON flag is set in response to the request by any portion of the methodology to enable clutch 34d. The LRNT tracks the amount of time which elapses while the LRON flag is set. If LRNT is greater than a first predetermined time value ($\lambda 1$), the methodology proceeds to block 832 where SLPC is set to R. LRNT essentially allows for sufficient time for fluid to actuate pressure switch 28d and as such, may be dependent upon the temperature of the fluid in transmission 16. In the example provided, $\lambda 1$ may vary between 0.2 and 2.5 seconds according to the formula: $\lambda 1 = 2.5 - (T/36)$ where T is the temperature of the fluid in transmission 16. The methodology then proceeds to bubble 812 and the N-R subroutine terminates. Returning to decision block 828, if LRNT is not greater than a predetermined value $\lambda 1$, the methodology proceeds to decision block 836 where the methodology determines if LRNT has exceeded a second predetermined value.

In the example illustrated, second predetermined ($\lambda 2$) time is set at 14 ms. If LRNT has not exceeded $\lambda 2$, the methodology proceeds to block 808 and progresses as described above. If LRNT has exceeded $\lambda 2$, the methodology proceeds to decision block 840 where the previous status of the LRP flag (LRPi) is evaluated.

If LRPi was set (i.e., LRPi=1), the methodology proceeds to block 832 and progresses as described above. If LRPi was not set, the methodology proceeds to block 808 and progresses as described above.

N-D Subroutine

Figure 9:
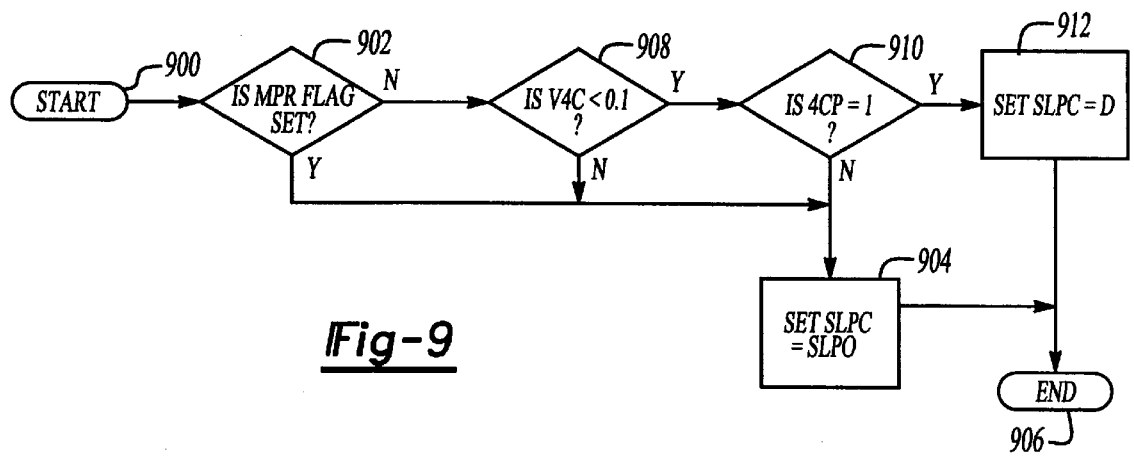
FIG. 9 is a schematic diagram in flowchart form of the N-D subroutine.

With reference to FIG. 9, the N-D subroutine is entered at bubble 900 and proceeds to decision block 902 where the status of the manual valve port restriction (MPR) flag is checked. The MRP flag indicates whether manual valve 26 has been shifted to a point where the flow of fluid to any of the clutches 34 which may be cycled when the shift lever is placed in the "D" position is restricted, thereby causing excessive slippage of the elements of one or more clutches 34 that support the operation of the presently operating gear ratio. The MRP flag is set, for example, under the following conditions:

the PDE flag is not set; and
the PC is indicative of the T3 position; and
one of the following occurs
   a. the LDP flag is set as a result of either 1) a persistent variance between the speed of the torque converter 14 turbine and the output shaft of transmission 16; or 2) a persistent loss of pressure as detected by a pressure switch 28 on a hydraulic conduit 24 which supplies fluid to a clutch 34 that supports the operation of a presently operating gear ratio; or
   b. a SL1 test is performed repetitively for a predetermined number of times, each time resulting in a change of the SLP from N to D when the PC is indicative of the T3 position; or
   c. the clutch of torque converter 14 is repeatedly turned "off" in response to a slipping condition at clutch 34d caused by a loss of fluid pressure which resulted from the combined effects of the operation of the clutch of torque converter 14 and the positioning of manual valve 26.

If the MPR flag is set, the methodology proceeds to block 904 where SLPC is set to SLP0. The methodology then proceeds to bubble 906 where the N-D subroutine terminates.

Referring back to decision block 902, if the MPR flag is not set, the methodology proceeds to decision block 908 where the instantaneous volume (V4C) through valve 32f is checked. If V4C is not less than a predetermined volume, the methodology proceeds to block 904. In the preferred embodiment, the predetermined volume is 0.1 cubic inches. Returning to decision block 908, if V4C is less than the predetermined volume indicating that a SLP1 test may be performed without concern that clutch 34f may still have residual pressure from operation of transmission 18 in the overdrive gear ratio that could result in the indication of pressure exceeding a predetermined pressure by pressure switch 28f. The methodology then proceeds to decision block 910 where the data from the pressure switch 28f is checked. If the data from pressure switch 28f does not indicate the presence of fluid exceeding a predetermined pressure and the methodology proceeds to block 904. If the data from pressure switch 28f indicates the presence of fluid having a pressure exceeding a predetermined pressure, the methodology proceeds to block 912 where SLPC is set to D. The methodology then proceeds to bubble 906 where the N-D subroutine terminates.

D-N Subroutine

Figure 10:
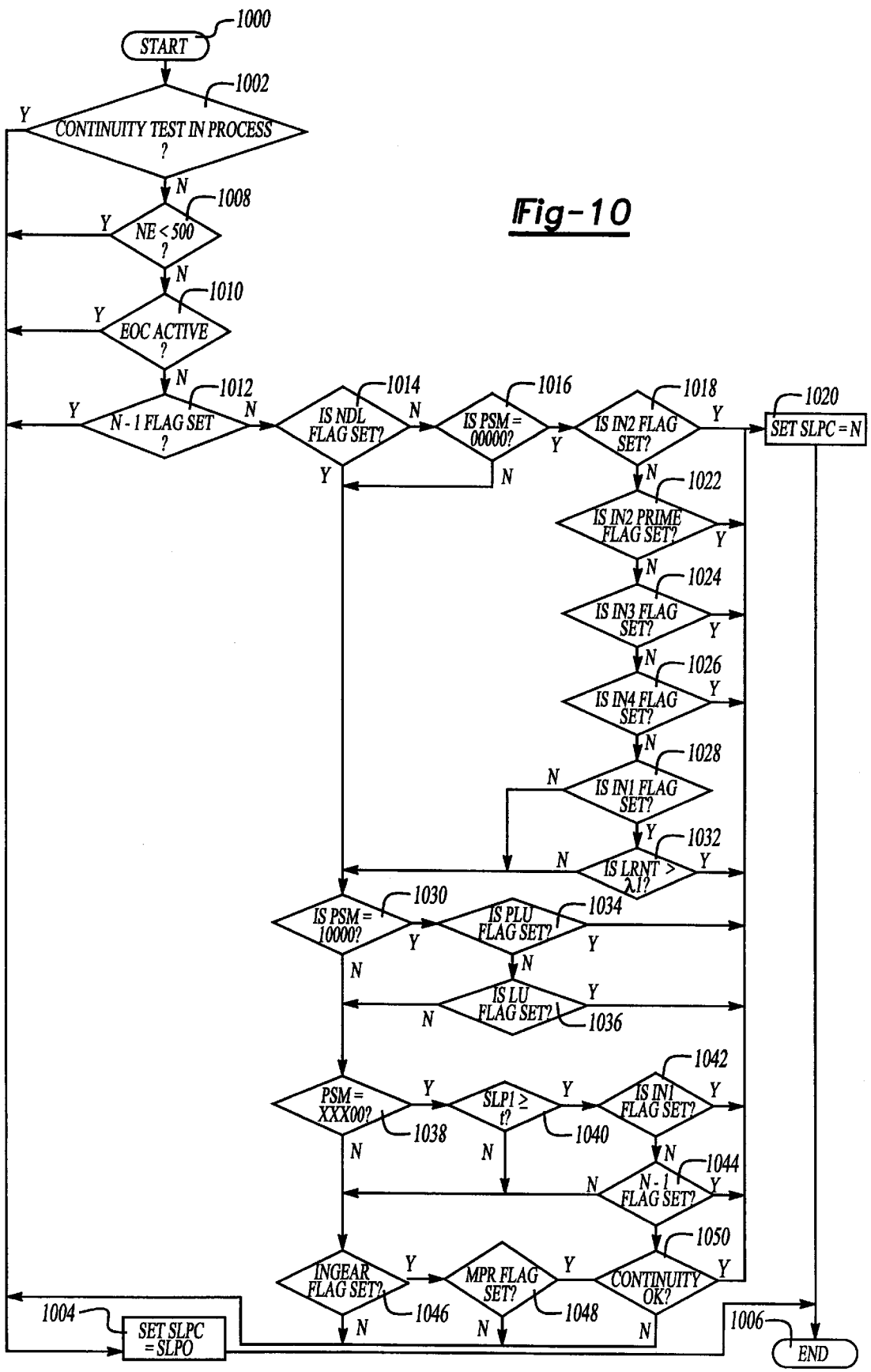
FIG. 10 is a schematic diagram in flowchart form of the D-N subroutine.

With reference to FIG. 10, the D-N subroutine is entered through bubble 1000 and proceeds to decision block 1002 where the methodology determines whether a continuity test is in process. The continuity test is performed periodically on solenoids 30 to ensure that they are operating properly. If the continuity test is in process, control of solenoids 30 is not possible and the methodology advances to block 1004 where SLPC is set to SLP0. The methodology then proceeds to bubble 1006 where the D-N subroutine terminates. Returning to decision block 1002, if the continuity test is not in progress, the methodology proceeds to decision block 1008.

In decision block 1008, the methodology determines if Ne is less than 500 r.p.m. If Ne is less than 500 r.p.m., the methodology proceeds to block 1004. If Ne is not less than 500 r.p.m., the methodology proceeds to decision block 1010 where the methodology determines if the element overlap control (EOC) is active. EOC is used when a serious fault has occurred in transmission 16 or transmission controller 18, causing transmission 16 to be operated in an open-loop manner on a "limp-home" basis.

If EOC is active in decision block 1010 indicating that the SLP methodology should not be utilized, the methodology proceeds to block 1004. If EOC is not active in decision block 1010, the methodology proceeds to decision block 1012.

In decision block 1012, if a shift is being performed, the methodology evaluates the status of the neutral-to-first shift (N–1) flag. The status of N–1 flag indicates whether a shift from the neutral gear ratio to the low gear ratio is in progress. If the N–1 flag is not set indicating that a neutral-to-low shift is not in progress, the methodology proceeds to block 1004. If the N–1 flag is set in decision block 1012, the methodology proceeds to decision block 1014 where the status of the no drive logic (NDL) flag is checked. The NDL flag indicates that a serious fault has occurred and that transmission controller is attempting to vent clutches 34 to lower the speed of vehicle 10 prior to the opening of valves 32*a* and 32*g*. Valves 32*a* and 32*g* allow transmission 16 to be operated in the "R", "N/P", "D" and "2" gear ratios strictly through the manipulation of manual valve 26. Accordingly, the reduction in the speed of vehicle 10 is necessary to ensure that the opening of valve 32*g* will not cause damage to engine 12 or transmission 16 through inadvertence of the vehicle operator. If the NDL flag is not set, the methodology proceeds to decision block 1016.

In decision block 1016, the methodology determines whether the PSM is set to 00000. If the PSM is set to 00000 indicating that pressure switches 28*d*, 28*e*, 28*c*, 28*f*, and 28*a* have not detected fluid pressure in excess of a predetermined pressure, the methodology proceeds to decision block 1018. If the PSM is not set to 00000 indicating that one or more of pressure switches 28*d*, 28*e*, 28*c*, 28*f*, and 28*a* have detected the presence of fluid in excess of a predetermined pressure, the methodology proceeds to decision block 1030.

In decision block 1018, the methodology checks the status of the IN2 flag. The IN2 flag indicative of whether transmission 16 is operating in the "2" gear ratio as activated by clutches 34*a* and 34*e*. If the IN2 flag is set indicating that transmission 16 is engaged in the "2" gear ratio, the methodology proceeds to block 1020 where SLPC is set to N. The methodology then proceeds to bubble 1006 where the D-N subroutine terminates. Returning to decision block 1018, if the IN2 flag is not set indicating that transmission 16 is not operating in the "2" gear ratio, the methodology proceeds to decision block 1022 where the status of the IN2PRIME flag is checked.

The IN2PRIME flag is indicative of whether transmission 16 is operating in the "2 prime" gear ratio as activated by clutches 34*a* and 34*f*. If the IN2PRIME flag is set in decision block 1022 indicating that transmission 16 is operating in the "2 prime" gear ratio, the methodology proceeds to block 1020. If the IN2PRIME flag is not set in decision block 1022 indicating that transmission 16 is not operating in the "2 prime" gear ratio, the methodology proceeds to decision block 1024 where the status of the IN3 flag is checked.

The IN3 flag is indicative of whether transmission 16 is operating in the "direct" gear ratio as activated by clutches 34*a* and 34*c*. If the IN3 flag is set in decision block 1024 indicating that transmission 16 is operating in the "direct" gear ratio, the methodology proceeds to block 1020. If the IN3 flag is not set in decision block 1024 indicating that transmission 16 is not operating in the "direct" gear ratio, the methodology proceeds to decision block 1026 where the status of the IN4 flag is checked.

The IN4 flag is indicative of whether transmission 16 is operating in the "overdrive" gear ratio as activated by clutches 34*c* and 34*f*. If the IN4 flag is set in decision block 1026 indicating that transmission 16 is operating in the "overdrive" gear ratio, the methodology proceeds to block 1020. If the IN4 flag is not set in decision block 1026 indicating that transmission 16 is operating in the "overdrive" gear ratio, the methodology proceeds to decision block 1028 where the status of the IN1 flag is checked.

The IN1 flag is indicative of whether transmission 16 is operating in the "L" gear ratio as operated by clutch 34*a* and occasionally 34*d*, depending on the programming of the shift schedule. If the IN1 flag is not set in decision block 1028, the methodology proceeds to decision block 1030. If the IN1 flag is set in decision block 1028, the methodology proceeds to decision block 1032 where the value of LRNT is checked. If the value of LRNT is greater than $\lambda 1$, the methodology proceeds to block 1020. If the value of LRNT is not greater than $\lambda 1$, the methodology proceeds to decision block 1030.

Referring back to decision block 1014, if the NDL flag is set, the methodology proceeds to decision block 1030 where the value of PSM is checked. If the value of PSM is equal to 10000 indicating that only pressure switch 28*d* has sensed the presence of a fluid having a pressure in excess or a predetermined pressure, the methodology proceeds to decision block 1034 where the status of the PLU flag is checked. The PLU flag indicates that the torque converter 14 clutch is being used to control the slippage between the turbine and impeller of the torque converter 14 at or below a predetermined first maximum value. If the PLU flag is set, the methodology proceeds to block 1020. If the PLU flag is not set in decision block 1034, the methodology proceeds to decision block 1036.

In decision block 1036 the methodology checks the status of the LU flag. The LU flag indicates that the torque converter 14 clutch is being used to control the slippage between the turbine and impeller of the torque converter 14 at or below a predetermined second maximum value which is generally less than the first maximum value used for PLU. If the LU flag is set, the methodology proceeds to block 1020. If the LU flag is not set, the methodology proceeds to decision block 1038.

Referring back to decision block 1030, If the value of PSM is not equal to 10000 indicating that pressure switch 28*d* has not detected the presence of a fluid having a pressure which exceeds a predetermined pressure, the methodology proceeds to decision block 1038 where the value of PSM is checked. If the value of PSM is XXX00 indicating that pressure switches 28*f* and 28*a* have not detected the presence of a fluid having a pressure which exceeds a predetermined pressure, the methodology proceeds to decision block 1040 where the SLP1 flag is checked. The SLP1 flag indicates that a SLP1 test is being performed wherein solenoid 30f is activated and pressure switch 28f is checked. If pressure switch 28f detects the presence of a fluid having a pressure which exceeds a predetermined pressure, the transmission is operating in one of the forward gear ratios (e.g., low, 2, direct, overdrive). If pressure switch 28f does not detect the presence of a fluid having a pressure which exceeds a predetermined pressure, the transmission may be operating in the "N" or "R" gear ratios.

If the SLP1 flag has not been set for a time that is equal to or greater than a predetermined SLP1 test time ($\tau 1$), the methodology proceeds to decision block 1046. Preferably, $\tau 1$ varies with the temperature of the fluid in transmission 16. In the example illustrated, $\tau 1$ varies between 0.15 and 0.8 seconds. If the SLP1 flag has been set for a time greater than or equal to $\tau 1$, the methodology proceeds to decision block 1042 where the status of the IN1 flag is checked.

In decision block 1042, if the IN1 flag is set, the methodology proceeds to block 1020. If the IN1 flag is not set in decision block 1042, the methodology proceeds to decision block 1044 where the N–1 flag is evaluated. If the N–1 flag is set in decision block 1044, the methodology proceeds to block 1020. If the N–1 flag is not set in decision block 1044, the methodology proceeds to decision block 1046.

Referring back to decision block 1038, if the value of PSM is not XXX00 indicating that one or more of pressure switches 28f and 28a have sensed the presence of a fluid having a pressure which exceeds a predetermined pressure, the methodology proceeds to decision block 1046 where the methodology evaluates the INGEAR flag. The INGEAR flag is set whenever transmission 16 is not shifting between two gear ratios 16a. If the INGEAR flag is not set, the methodology proceeds to block 1004. If the INGEAR flag is set in decision block 1046, the methodology proceeds to decision block 1048 where the status of the MPR flag is checked.

If the MPR flag is not set in decision block 1048, the methodology proceeds to block 1004. If the MPR flag is set in decision block 1048, the methodology proceeds to decision block 1050 where the continuity of solenoids 30 are checked. If the continuity of solenoids 30 are not within a predetermined limit in decision block 1050 indicating that they may not be properly controlled, the methodology proceeds to block 1004. If the continuity is within the predetermined limit in decision block 1050 indicating that solenoids 30 are controllable, the methodology proceeds to block 1020.

D-2/2-D Subroutine

Figure 11:
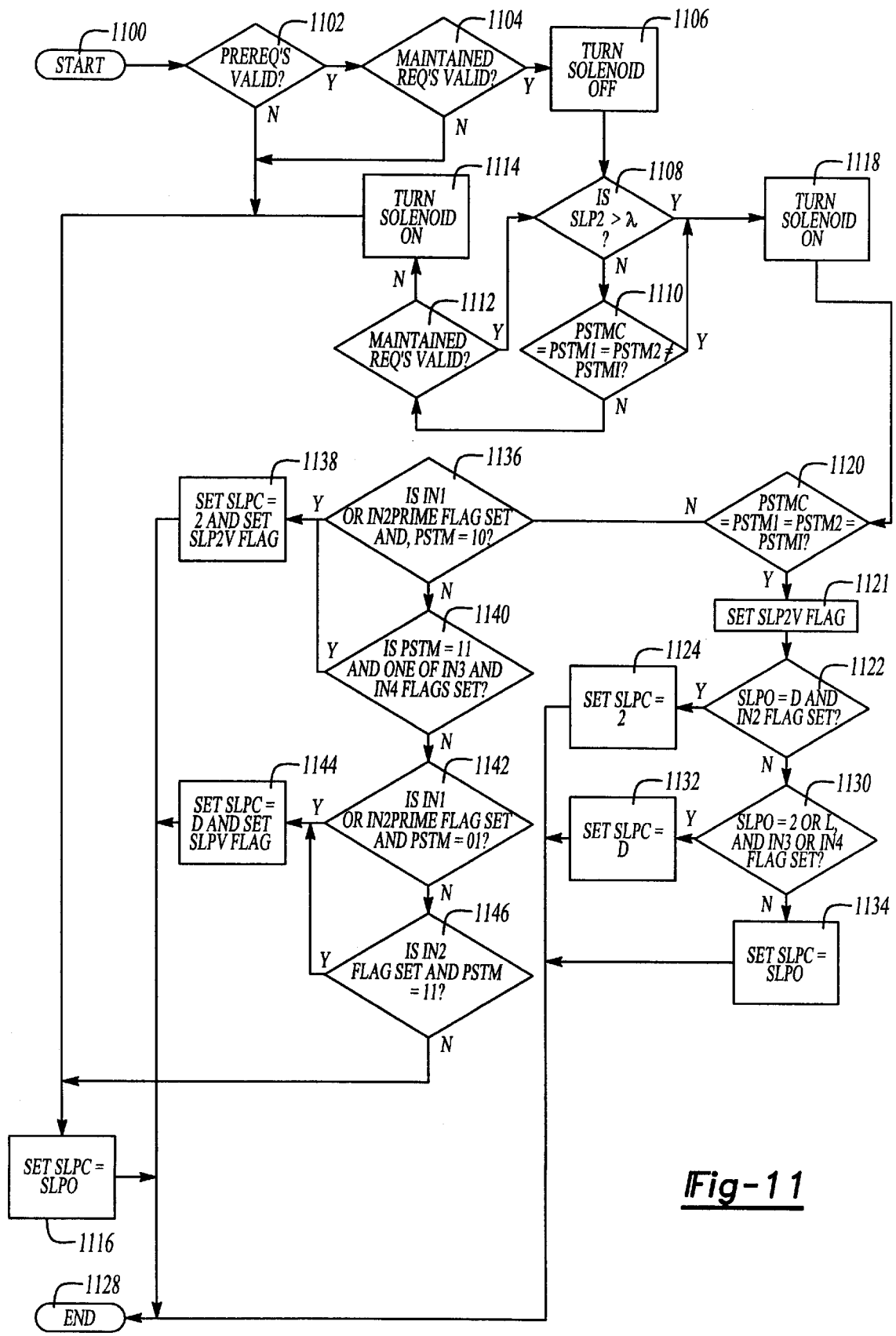
FIG. 11 is a schematic diagram in flowchart form of the D-2/2-D subroutine.

With reference to FIG. 11, the D-2/2-D subroutine is entered through bubble 1100 and proceeds to decision block 1102 where the methodology determines whether several "initial" conditions have been met. In the example provided, the "initial" conditions include:

fault counters for pressure switches 28c and 28e have a value of zero, indicating that these pressure switches are operational; and the time since the previous SLP2 test has exceeded a predetermined time ($\lambda 3$); and the time since the last continuity test has exceeded a predetermined time ($\lambda 4$); and the last continuity test indicated proper continuity or the continuity failure (CFR) flag has not been set and solenoid 30g is operational; and the transmission fluid temperature is greater than 15° F.; or SLPC is 2 or L; or the orderly shutdown (OSD) flag is set.

If the initial conditions are not met, the methodology proceeds to block 1116 where SLPC is set to SLP0. The methodology then proceeds to bubble 1128 where the D-2/2-D subroutine terminates. Returning to decision block 1102, if the predetermined conditions have been met, the methodology proceeds to decision block 1104 where the methodology checks whether a set of "maintained" conditions have been met. In the example provided, the "maintained" conditions include:

Ne greater than 500 r.p.m.; and the NDL flag is not set; or PSM not equal to 00000 and the INGEAR flag has been set for a time exceeding a predetermined time value $\tau 2$; and the EOC flag has not been set; and the D-2/2-D subroutine is requested.

If the "maintained" conditions have not been met, the methodology proceeds to block 1116. If the "maintained" conditions have been met, the methodology proceeds to block 1106 where solenoid 30g is turned off, causing valve 32g to open. The methodology then proceeds to decision block 1108.

In decision block 1108, if the SLP2 flag has been set for a time that exceeds a predetermined SLP2 time ($\tau 3$), the methodology proceeds to block 1118 where the SLP2 test is terminated and solenoid 30g is turned on causing valve 32g to close. If the SLP2 flag has not been set for a time that exceeds $\tau 3$, the methodology proceeds to decision block 1110 where the methodology compares several pressure switch test masks: PSTMC, PSTM1, PSTM2 and PSTMi. Each pressure switch test mask includes two digits which may either be a 1 or a 0. The first and second digits of the pressure switch test mask are indicative of the data from pressure switches 28e and 28c, respectively. A value of 1 indicates a logical state where the corresponding pressure switch has sensed the presence of a fluid having a pressure which exceeds a predetermined pressure. A value of 0 indicates a logical state where the corresponding pressure switch has not sensed the presence of fluid having a pressure which exceeds a predetermined pressure. PSTMC is the current pressure switch mask. PSTMi is the initial pressure switch mask at the start of the SLP2. PSTM1 and PSTM2 are initially set to PSTMi and are updated to reflect the previous and second previous pressure switch masks respectively.

Returning to decision block 1110, if PSTMC, PSTM1 and PSTM2 are equal and PSTM2 does not equal PSTMi, the methodology proceeds to block 1118. If PSTMC, PSTM1 and PSTM2 are not equal or if PSTM2 equals PSTMi, the methodology proceeds to decision block 1112 where the methodology checks the "maintained" requirements mentioned above in decision block 1104. If any of the "maintained" requirements are not met, the methodology proceeds to block 1114 where the SLP2 test is terminated and solenoid 30g is turned on and valve 32g is closed. The methodology then proceeds to block 1116. Returning to decision block 1112, if all of the "maintained" requirements are still met, the methodology loops-back to decision block 1108.

Referring back to block 1118, once the methodology has turned solenoid 30g on and terminated the SLP2 test, the methodology proceeds to decision block 1120 where the values of PSTMC, PSTM1, PSTM2 and PSTMi are compared. If the values of PSTMC, PSTM1, PSTM2 and PSTMi are equal, the methodology proceeds to block 1121 where the SLP2 complete and verified (SLP2V) flag is set. The methodology then proceeds to decision block 1122 where SLP0 and the IN2 flag are checked. If SLP0 is D and the IN2 flag is set, the methodology proceeds to block 1124 where SLPC is set to 2. The methodology then proceeds to bubble 1128. If SLP0 is not D or the IN2 flag is not set in decision block 1122, the methodology proceeds to decision block 1130 where SLP0 and the IN3 and IN4 flags are checked. If SLP0 is 2 or L and either one of the IN3 and IN4 flags have been set, the methodology proceeds to decision block 1132 where SLPC is set to D. The methodology then proceeds to bubble 1128.

Returning to decision block 1130, if SLP0 is not 2 or L and/or if neither one of the IN3 and IN4 flags have been set, the methodology proceeds to block 1134 where SLPC is set to SLP0. The methodology then proceeds to bubble 1128.

Referring back to decision block 1120, if the values of PSTMC, PSTM1, PSTM2 and PSTMi are not equal, the methodology proceeds to decision block 1136 where the value of PSTMC and the status of the IN1 and IN2PRIME flags are checked. If the value of PSTMC is equal to 10 and the IN1 and IN2PRIME flags have been set, the methodology proceeds to block 1138 where SLPC is set to 2 and the SLP2 complete and verified (SLP2V) flag is set. The methodology the proceeds to bubble 1128. Returning to decision block 1136, if the value of PSTMC is not equal to 10 and/or if either of the IN1 and IN2PRIME flags have not been set, the methodology proceeds to block 1140 where the value of PSTMC and the status of the IN3 and IN4 flags are checked.

In decision block 1140, if the value of PSTMC is equal to 11 and one of the IN3 and IN4 flags are set, the methodology proceeds to block 1138. If the value of PSTMC is not equal to 11 and/or neither of the IN3 and IN4 flags are set, the methodology proceeds to decision block 1142 where the value of PSTMC and the status of the IN1 and IN2PRIME flags is checked. If the value of PSTMC is equal to 01 and the IN1 and IN2PRIME flags have been set, the methodology proceeds to block 1144 where SLPC is set to D and the SLPV flag is set. The methodology then proceeds to bubble 1128. Returning to decision block 1142, if the value of PSTMC is not equal to 01 and/or either of the IN1 and IN2PRIME flags have not been set, the methodology proceeds to decision block 1146 where the value of PSTMC and the status of IN2 are checked. If the value of PSTMC is 11 and the IN2 flag is set, the methodology proceeds to block 1144. If the value of PSTMC is not 11 and/or the IN2 flag is not set, the methodology proceeds to block 1116.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. In a vehicle having an engine and a transmission including an input member, an output member, a gear assembly for changing the ratio of torque between said input and output members, a plurality of selectively engagable clutches for shifting said gear assembly, a plurality of sensors providing signals indicative of measurement data for predetermined conditions, a controller having memory for processing and storing the signals and predetermined values and providing signals to control said plurality of clutches, at least one PRND2L sensor sensing the position of a manually operated shift lever to select between a plurality of predetermined operating modes of said transmission such as park (P), reverse (R), neutral (N), drive (D), second (2) and low (L), and a plurality of temporary positions such as T1, T2, T3, T4 and T5 and providing a PRND2L code indicative of each of said predetermined operating mode and temporary positions, said PRND2L code having a plurality of data bits, a method of identifying a plurality of operating modes of said transmission and allowing operation of said transmission with a temporary or invalid PRND2L code utilizing signals from said plurality of sensors, said method comprising the steps of:

generating a PRND2L code indicative of a current position of said shift lever;

determining if said PRND2L sensor has produced invalid PRND2L codes for a time exceeding a predetermined time threshold;

determining if said PRND2L code is valid;

determining if hydraulic pressure above a predetermined pressure level is available;

setting a current shift lever logic position to a previous shift lever logic position if said PRND2L sensor has not produced invalid PRND2L codes for a time exceeding said predetermined time threshold and said PRND2L code is invalid;

otherwise, setting said current shift lever logic position based upon said previous shift lever logic position, said PRND2L code and a first predetermined schedule if said PRND2L sensor has not produced invalid PRND2L codes for a time exceeding said predetermined time threshold, said PRND2L code is not invalid and hydraulic pressure above said predetermined pressure level is not available;

otherwise, setting said current shift lever logic position based upon said previous shift lever logic position, said PRND2L code, said signals from said plurality of sensors and a second predetermined schedule if said PRND2L sensor has not produced invalid PRND2L codes for a time exceeding said predetermined time, said PRND2L code is not invalid and hydraulic pressure above said predetermined pressure level is available;

otherwise, setting said current shift lever logic position based upon said previous shift lever logic position, said PRND2L code and a third predetermined schedule if said PRND2L sensor has produced invalid PRND2L codes for a time exceeding said predetermined time threshold and said PRND2L code is invalid;

otherwise, setting said current shift lever logic position based upon said previous shift lever logic position and said signals from said plurality of sensors and a fourth predetermined schedule if hydraulic pressure above said predetermined pressure level is available and said PRND2L sensor has produced invalid PRND2L codes for a time exceeding said predetermined time threshold and said PRND2L code is not invalid; and otherwise, setting said current shift lever logic position to previous shift lever logic position.

2. The method of claim 1 wherein said PRND2L code includes five bits.

3. The method of claim 1 wherein said step of setting said current shift lever logic position based upon said previous shift lever logic position, said PRND2L code and said first predetermined schedule includes the steps of:

setting said current shift lever logic position to D if said PRND2L code is a transition code between said D and said 2 positions and said previous shift lever logic position is D, N or R; and otherwise, setting said current shift lever logic position to 2 if said PRND2L code is a transition code between said D and said 2 positions.

4. The method of claim 1 wherein said step of setting said current shift lever logic position based upon said previous shift lever logic position, said PRND2L code and said first predetermined schedule includes the steps of:

setting said current shift lever logic position to L if said PRND2L code is a transition code between said 2 and said L positions and said previous shift lever logic position is L; and otherwise, setting said current shift lever logic position to 2 if said PRND2L code is a transition code between said 2 and said L positions.

5. The method of claim 1 wherein said step of setting said current shift lever logic position based upon said previous shift lever logic position, said PRND2L code, said signals from said plurality of sensors a nd said second predetermined schedule further comprises the steps of:

setting said current shift lever logic position equal to said PRND2L code when said PRND2L code is not indicative of any of said temporary codes;

otherwise, determining if said shift lever has been moved in a first direction;

if said PRND2L code is indicative of any of said temporary codes, said shift lever has been moved in said first direction and said previous shift lever logic position does not correspond to a shift lever position adjacent to said PRND2L code, setting current shift lever logic position to a first non-temporary PRND2L code adjacent to said PRND2L code in a direction opposite said first direction;

if said PRND2L code is indicative of any of said temporary codes, said shift lever has been moved in said first direction and said previous shift lever logic position corresponds to a shift lever position adjacent to said PRND2L code, performing a subroutine to determine if current shift lever logic position should be set to previous shift lever logic position or to a second non-temporary PRND2L code adjacent to said PRND2L code in said first direction; and if said PRND2L code is indicative of any of said temporary codes, said shift lever has not been moved in said first direction, performing a subroutine to determine if current shift lever logic position should be set to previous shift lever logic position or to said first non-temporary PRND2L code.

6. The method of claim 5 wherein the step of performing a subroutine to determine if current shift lever logic position should be set to previous shift lever logic position or to a second non-temporary PRND2L code adjacent to said PRND2L code in said first direction comprises the steps of:

determining whether a fluid of sufficient pressure is being supplied to one or more of said clutches to maintain engagement of a gear ratio corresponding to said previous shift lever logic position;

setting current shift lever logic position equal to previous shift lever logic position if engagement of said gear ratio can be maintained;

otherwise, setting current shift lever logic position equal to said second non-temporary PRND2L code.

7. The method of claim 5 wherein the step of performing a subroutine to determine if current shift lever logic position should be set to previous shift lever logic position or to said first non-temporary PRND2L code comprises the steps of:

determining whether a fluid of sufficient pressure is being supplied to one or more of said clutches to maintain engagement of a gear ratio corresponding to said previous shift lever logic position;

setting current shift lever logic position equal to previous shift lever logic position if engagement of said gear ratio can be maintained;

otherwise, setting current shift lever logic position equal to said first non-temporary PRND2L code.

8. The method of claim 1 wherein said step of setting said current shift lever logic position based upon said previous shift lever logic position, said PRND2L code and said third predetermined schedule comprises the steps of:

setting said current shift lever logic position to L if said PRND2L code is L;

otherwise, evaluating a bit pattern forming said PRND2L code;

determining whether said bit pattern is consistent with a predetermined bit pattern;

if said bit pattern is consistent with said predetermined bit pattern, setting current shift lever logic position to a predetermined intermediate shift lever logic position between said previous shift lever logic position and an shift lever logic position corresponding or adjacent to a shift lever position at which said PRND2L sensor would normally produce said bit pattern; and if said bit pattern is not consistent with said predetermined bit pattern, setting said current shift lever logic position based upon said previous shift lever logic position and said signals from said plurality of sensors and said fourth predetermined schedule if hydraulic pressure above said predetermined pressure level is available and said invalid PRDN2L code has been maintained for a time exceeding a predetermined time threshold is set.

9. The method of claim 1 wherein said step of setting said current shift lever logic position based upon said previous shift lever logic position and said signals from said plurality of sensors and said fourth predetermined schedule includes the steps of:

determining if said shift lever has been moved in a first direction from previous shift lever logic position to a first position corresponding to a first adjacent shift lever logic setting;

setting current shift lever logic position to said first adjacent shift lever logic setting if said shift lever has been moved to said first position;

otherwise, if said previous shift lever logic position is not R, determining if current shift lever logic position is the same as previous shift lever logic position;

determining if said shift lever has been moved in a second direction from previous shift lever logic position to a second position corresponding to a second adjacent shift lever logic setting;

setting shift lever logic to said second adjacent shift lever logic setting if said shift lever has been moved to said second position and said previous shift lever logic position is not R; and otherwise, setting shift lever logic equal to previous shift lever logic position.

10. In a vehicle having an engine and a transmission including an input member, an output member, a gear assembly for changing the ratio of torque between said input and output members, a plurality of selectively engagable clutches for shifting said gear assembly, a plurality of sensors providing signals indicative of measurement data for predetermined conditions, a controller having memory for processing and storing the signals and predetermined values and providing signals to control said plurality of clutches, at least one PRND2L sensor sensing the position of a manually operated shift lever to select between a plurality of predetermined operating modes of said transmission such as park (P), reverse (R), neutral (N), drive (D), second (2) and low (L), and a plurality of temporary positions such as T1, T2, T3, T4 and T5 and providing a PRND2L code indicative of each of said predetermined operating mode and temporary positions, said PRND2L code having a plurality of data bits, a method of identifying a plurality of operating modes of said transmission and allowing operation of said transmission with a temporary or invalid PRND2L code utilizing signals from said plurality of sensors, said method comprising the steps of:

generating a PRND2L code indicative of a current position of said shift lever;

determining if said PRND2L sensor has produced invalid PRND2L codes for a time exceeding a predetermined time threshold;

determining if said PRND2L code is valid;

determining if hydraulic pressure above a predetermined pressure level is available;

setting a current shift lever logic position to a previous shift lever logic position if said PRND2L sensor has not produced invalid PRND2L codes for a time exceeding said predetermined time threshold and said PRND2L code is invalid;

otherwise, setting said current shift lever logic position based upon said previous shift lever logic position, said PRND2L code and a first predetermined schedule if said PRND2L sensor has not produced invalid PRND2L codes for a time exceeding said predetermined time threshold, said PRND2L code is not invalid and hydraulic pressure above said predetermined pressure level is not available;

otherwise, setting said current shift lever logic position based upon said previous shift lever logic position, said PRND2L code, said signals from said plurality of sensors and a second predetermined schedule if said PRND2L sensor has not produced invalid PRND2L codes for a time exceeding said predetermined time, said PRND2L code is not invalid and hydraulic pressure above said predetermined pressure level is available;

otherwise, setting said current shift lever logic position based upon said previous shift lever logic position and said signals from said plurality of sensors and said third predetermined schedule if hydraulic pressure above said predetermined pressure level is available and said PRND2L sensor has produced invalid PRND2L codes for a time exceeding said predetermined time threshold.

11. The method of claim 10 wherein said step of setting said current shift lever logic position based upon said previous shift lever logic position, said PRND2L code and said first predetermined schedule includes the steps of:

setting said current shift lever logic position to D if said PRND2L code is a transition code between said D and said 2 positions and said previous shift lever logic position is D, N or R; and otherwise, setting said current shift lever logic position to 2 if said PRND2L code is a transition code between said D and said 2 positions.

12. The method of claim 10 wherein said step of setting said current shift lever logic position based upon said previous shift lever logic position, said PRND2L code and said first predetermined schedule includes the steps of:

setting said current shift lever logic position to L if said PRND2L code is a transition code between said 2 and said L positions and said previous shift lever logic position is L; and otherwise, setting said current shift lever logic position to 2 if said PRND2L code is a transition code between said 2 and said L positions.

13. The method of claim 10 wherein said step of setting said current shift lever logic position based upon said previous shift lever logic position, said PRND2L code, said signals from said plurality of sensors and said second predetermined schedule further comprises the steps of:

setting said current shift lever logic position equal to said PRND2L code when said PRND2L code is not indicative of any of said temporary codes;

otherwise, determining if said shift lever has been moved in a first direction;

if said PRND2L code is indicative of any of said temporary codes, said shift lever has been moved in said first direction and said previous shift lever logic position does not correspond to a shift lever position adjacent to said PRND2L code, setting current shift lever logic position to a first non-temporary PRND2L code adjacent to said PRND2L code in a direction opposite said first direction;

if said PRND2L code is indicative of any of said temporary codes, said shift lever has been moved in said first direction and said previous shift lever logic position corresponds to a shift lever position adjacent to said PRND2L code, performing a subroutine to determine if current shift lever logic position should be set to previous shift lever logic position or to a second non-temporary PRND2L code adjacent to said PRND2L code in said first direction; and if said PRND2L code is indicative of any of said temporary codes, said shift lever has not been moved in said first direction, performing a subroutine to determine if current shift lever logic position should be set to previous shift lever logic position or to said first non-temporary PRND2L code.

14. The method of claim 13 wherein the step of performing a subroutine to determine if current shift lever logic position should be set to previous shift lever logic position or to a second non-temporary PRND2L code adjacent to said PRND2L code in said first direction comprises the steps of:

determining whether a fluid of sufficient pressure is being supplied to one or more of said clutches to maintain engagement of a gear ratio corresponding to said previous shift lever logic position;

setting current shift lever logic position equal to previous shift lever logic position if engagement of said gear ratio can be maintained;

otherwise, setting current shift lever logic position equal to said second non-temporary PRND2L code.

15. The method of claim 13 wherein the step of performing a subroutine to determine if current shift lever logic position should be set to previous shift lever logic position or to said first non-temporary PRND2L code comprises the steps of:

determining whether a fluid of sufficient pressure is being supplied to one or more of said clutches to maintain engagement of a gear ratio corresponding to said previous shift lever logic position;

setting current shift lever logic position equal to previous shift lever logic position if engagement of said gear ratio can be maintained;

otherwise, setting current shift lever logic position equal to said first non-temporary PRND2L code.

16. The method of claim 10 wherein said step of setting said current shift lever logic position based upon said previous shift lever logic position and said signals from said plurality of sensors and said third predetermined schedule includes the steps of:

determining if said shift lever has been moved in a first direction from previous shift lever logic position to a first position corresponding to a first adjacent shift lever logic setting;

setting current shift lever logic position to said first adjacent shift lever logic setting if said shift lever has been moved to said first position;

otherwise, if said previous shift lever logic position is not R, determining if current shift lever logic position is the same as previous shift lever logic position;

determining if said shift lever has been moved in a second direction from previous shift lever logic position to a second position corresponding to a second adjacent shift lever logic setting;

setting shift lever logic to said second adjacent shift lever logic setting if said shift lever has been moved to said second position and said previous shift lever logic position is not R; and otherwise, setting shift lever logic equal to previous shift lever logic position.

17. The method of claim 10 further comprising the step of setting said current shift lever logic position based upon said previous shift lever logic position, said PRND2L code and a fourth predetermined schedule if said PRND2L sensor has produced invalid PRND2L codes for a time exceeding said predetermined time threshold and said PRND2L code is invalid.

18. The method of claim 17 wherein said step of setting said current shift lever logic position based upon said previous shift lever logic position, said PRND2L code and said fourth predetermined schedule comprises the steps of:

setting said current shift lever logic position to L if said PRND2L code is L;

otherwise, evaluating a bit pattern forming said PRND2L code;

determining whether said bit pattern is consistent with a predetermined bit pattern;

if said bit pattern is consistent with said predetermined bit pattern, setting current shift lever logic position to a predetermined intermediate shift lever logic position between said previous shift lever logic position and an shift lever logic position corresponding or adjacent to a shift lever position at which said PRND2L sensor would normally produce said bit pattern; and if said bit pattern is not consistent with said predetermined bit pattern, setting said current shift lever logic position based upon said previous shift lever logic position and said signals from said plurality of sensors and said fourth predetermined schedule if hydraulic pressure above said predetermined pressure level is available and said invalid PRDN2L code has been maintained for a time exceeding a predetermined time threshold is set.

19. In a vehicle having an engine and a transmission including an input member, an output member, a gear assembly for changing the ratio of torque between said input and output members, a plurality of selectively engagable clutches for shifting said gear assembly, a plurality of sensors providing signals indicative of measurement data for predetermined conditions, a controller having memory for processing and storing the signals and predetermined values and providing signals to control said plurality of clutches, at least one PRND2L sensor sensing the position of a manually operated shift lever to select between a plurality of predetermined operating modes of said transmission such as park (P), reverse (R), neutral (N), drive (D), second (2) and low (L), and a plurality of temporary positions such as T1, T2, T3, T4 and T5 and providing a PRND2L code indicative of each of said predetermined operating mode and temporary positions, said PRND2L code having a plurality of data bits, a method of identifying a plurality of operating modes of said transmission and allowing operation of said transmission with a temporary or invalid PRND2L code utilizing signals from said plurality of sensors, said method comprising the steps of:

generating a PRND2L code indicative of a current position of said shift lever;

determining if said PRND2L sensor has produced invalid PRND2L codes for a time exceeding a predetermined time threshold;

determining if said PRND2L code is valid;

determining if hydraulic pressure above a predetermined pressure level is available;

setting said current shift lever logic position based upon said previous shift lever logic position, said PRND2L code, said signals from said plurality of sensors and a first predetermined schedule if said PRND2L sensor has not produced invalid PRND2L codes for a time exceeding said predetermined time, said PRND2L code is not invalid and hydraulic pressure above said predetermined pressure level is available;

otherwise, setting said current shift lever logic position based upon said previous shift lever logic position, said PRND2L code and a second predetermined schedule if said PRND2L code is not invalid and hydraulic pressure above said predetermined pressure level is not available;

otherwise, setting said current shift lever logic position based upon said previous shift lever logic position and said signals from said plurality of sensors and a third predetermined schedule if hydraulic pressure above said predetermined pressure level is available and said PRND2L code is invalid; and otherwise, setting said current shift lever logic position to previous shift lever logic position.

* * * * *